United States Patent [19]
Kakuta et al.

[11] Patent Number: 5,600,783
[45] Date of Patent: Feb. 4, 1997

[54] DISC ARRAY SYSTEM HAVING DISC STORAGE DEVICES DISPERSED ON PLURAL BOARDS AND ACCESSIBLE AT WITHDRAWAL OF PART OF THE BOARDS

[75] Inventors: Hitoshi Kakuta, Tokyo; Yoshifumi Takamoto, Fuchu; Toyohiko Kagimasa, Sagamihara, all of Japan

[73] Assignee: Hitachi, Ltd., Tokyo, Japan

[21] Appl. No.: 350,080

[22] Filed: Nov. 29, 1994

[30] Foreign Application Priority Data

Nov. 30, 1993  [JP]  Japan ................. 5-329810

[51] Int. Cl.$^6$ ....................................... G06F 11/00
[52] U.S. Cl. ............................ 395/182.04; 371/10.2
[58] Field of Search .................... 395/182.04, 182.05, 395/182.03, 182.06; 371/10.2

[56] References Cited

U.S. PATENT DOCUMENTS

| H1,221 | 8/1993 | Best et al. ................. 360/97.1 |
| 5,077,736 | 12/1991 | Dunphy, Jr. et al. ............ 371/10.1 |
| 5,208,813 | 5/1993 | Stallmo ..................... 371/10.1 |
| 5,264,975 | 11/1993 | Bajorek et al. ............... 360/97.01 |
| 5,301,297 | 4/1994 | Menon et al. ................. 395/425 |
| 5,367,669 | 11/1994 | Holland et al. ............... 395/575 |
| 5,485,446 | 1/1996 | Uno et al. ................... 369/75.1 |

FOREIGN PATENT DOCUMENTS

| 0541992A2 | 5/1993 | European Pat. Off. . |
| 0550853A3 | 7/1993 | European Pat. Off. . |
| 3108178 | 5/1991 | Japan . |
| 4205988 | 7/1992 | Japan . |
| 4228153 | 8/1992 | Japan . |

OTHER PUBLICATIONS

"Performance Analysis of Disk Arrays Under Failure", R. Muntz et al, UCLA Computer Science Dept., Proceedings of the 16th VLDB Conference, Aug. 1990, pp. 162–173.

Primary Examiner—Robert W. Beausoliel, Jr.
Assistant Examiner—Norman M. Wright
Attorney, Agent, or Firm—Antonelli, Terry, Stout & Kraus

[57] ABSTRACT

A disc array system has a plurality of disc storage devices (i.e., drives) constituting a parity group and mounted in a distributed manner on different boards. Where any one drive in the same parity group develops a fault, the board carrying the faulty drive is withdrawn from the mother board for repair. If the CPU issues a write request for data held in the faulty drive or in any normal data on the same board, the requested data is recovered from the multiple data retained in the other drives constituting the same logical group and mounted on the other boards. The recovered data is sent to the CPU.

If the CPU supplies write data to the faulty drive or to any normal drive on the same board, the supplied write data is held temporarily in a cache memory in an array controller. Later, when the board is repaired and replaced onto the mother board, the data to be held in the alternate drive having replaced the faulty drive is recovered from the data in the other drives, and the recovered data is written to that alternate drive. Then the write data in the cache memory is written to the alternate drive or to the target normal drive.

42 Claims, 10 Drawing Sheets

FIG. 4

21 LOGICAL GROUP TABLE

| LOGICAL ADDRESS | LOGICAL GROUP No. | SUB-DATA NAME | | | PARITY DATA NAME |
|---|---|---|---|---|---|
| D#1 | LG#1 | D#1-1 | D#1-2 | D#1-3 | P#1 |
| D#2 | | D#2-1 | D#2-2 | D#2-3 | P#2 |
| D#3 | | D#3-1 | D#3-2 | D#3-3 | P#3 |
| D#4 | | D#4-1 | D#4-2 | D#4-3 | P#4 |
| D#5 | | D#5-1 | D#5-2 | D#5-3 | P#5 |
| — | | — | — | — | — |
| ⋮ | | ⋮ | ⋮ | ⋮ | ⋮ |
| D#11 | LG#2 | D#11-1 | D#11-2 | D#11-3 | P#11 |
| D#12 | | D#12-1 | D#12-2 | D#12-3 | P#12 |
| D#13 | | D#13-1 | D#13-2 | D#13-3 | P#13 |
| D#14 | | D#14-1 | D#14-2 | D#14-3 | P#14 |
| D#15 | | D#15-1 | D#15-2 | D#15-3 | P#15 |
| ⋮ | | ⋮ | ⋮ | ⋮ | ⋮ |
| ⋮ | ⋮ | ⋮ | ⋮ | ⋮ | ⋮ |

FIG. 5

31 ADDRESS TABLE

| | | 22 27 100 28 29 | | | | 30 SCSI DRIVE ADDRESS | | | | | | | | | | 32 | |
|---|---|---|---|---|---|---|---|---|---|---|---|---|---|---|---|---|---|
| LOGICAL GROUP No. | LOGICAL ADDRESS | BOARD ADDRESS | BOARD WITHDRAWAL | DRIVE No. | FAULT | BOARD ADDRESS | BOARD WITHDRAWAL | DRIVE No. | FAULT | BOARD ADDRESS | BOARD WITHDRAWAL | DRIVE No. | FAULT | BOARD ADDRESS | BOARD WITHDRAWAL | DRIVE No. | FAULT | INTERDRIVE ADDRESS |
| LG#1 | D#1 | BADR1 | 1 | SD#1 | 1 | BADR2 | 0 | SD#1 | 0 | BADR3 | 0 | SD#1 | 0 | BADR4 | 0 | SD#1 | 0 | SADR1 |
| | D#2 | | | SD#2 | 0 | | | SD#2 | 0 | | | SD#2 | 0 | | | SD#2 | 0 | SADR2 |
| | D#3 | | | SD#3 | 0 | | | SD#3 | 0 | | | SD#3 | 0 | | | SD#3 | 0 | SADR3 |
| | D#4 | | | SD#4 | 0 | | | SD#4 | 0 | | | SD#4 | 0 | | | SD#4 | 0 | SADR4 |
| | D#5 | | | SD#5 | 0 | | | SD#5 | 0 | | | SD#5 | 0 | | | SD#5 | 0 | SADR5 |
| | — | | | SD#6 | 0 | | | SD#6 | 0 | | | SD#6 | 0 | | | SD#6 | 0 | SADR6 |
| | ----- | | | ----- | ----- | | | ----- | ----- | | | ----- | ----- | | | ----- | ----- | ----- |

FIG. 7

21 LOGICAL GROUP TABLE

| LOGICAL ADDRESS | LOGICAL GROUP No. | SUB-DATA NAME | | | PARITY DATA NAME | |
|---|---|---|---|---|---|---|
| D#1 | LG#1 | D#1-1 | D#1-2 | D#1-3 | P#1 | Spare1 |
| D#2 | | D#2-1 | D#2-2 | D#2-3 | P#2 | Spare2 |
| D#3 | | D#3-1 | D#3-2 | D#3-3 | P#3 | Spare3 |
| D#4 | | D#4-1 | D#4-2 | D#4-3 | P#4 | Spare4 |
| D#5 | | D#5-1 | D#5-2 | D#5-3 | P#5 | Spare5 |
| — | | — | — | — | — | — |
| ⋮ | ⋮ | ⋮ | ⋮ | ⋮ | ⋮ | ⋮ |
| D#11 | LG#2 | D#11-1 | D#11-2 | D#11-3 | P#11 | Spare11 |
| D#12 | | D#12-1 | D#12-2 | D#12-3 | P#12 | Spare12 |
| D#13 | | D#13-1 | D#13-2 | D#13-3 | P#13 | Spare13 |
| D#14 | | D#14-1 | D#14-2 | D#14-3 | P#14 | Spare14 |
| D#15 | | D#15-1 | D#15-2 | D#15-3 | P#15 | Spare15 |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

Columns: 22 LOGICAL ADDRESS, 23 LOGICAL GROUP No., 24 SUB-DATA NAME, 25 PARITY DATA NAME, 26

FIG. 8

| LOGICAL GROUP No. | LOGICAL ADDRESS | BOARD ADDRESS | BOARD WITHDRAWAL | DRIVE No. | FAULT | BOARD ADDRESS | BOARD WITHDRAWAL | DRIVE No. | FAULT | BOARD ADDRESS | BOARD WITHDRAWAL | DRIVE No. | FAULT | BOARD ADDRESS | BOARD WITHDRAWAL | DRIVE No. | FAULT | BOARD ADDRESS | BOARD WITHDRAWAL | DRIVE No. | FAULT | INTER-DRIVE ADDRESS |
|---|---|---|---|---|---|---|---|---|---|---|---|---|---|---|---|---|---|---|---|---|---|---|
| | | | | | | | | | | SCSI DRIVE ADDRESS | | | | | | | | | | | | |
| LG#1 | D#1 | BADR1 | 1 | SD#1 | 1 | BADR2 | 0 | SD#1 | 0 | BADR3 | 0 | SD#1 | 0 | BADR4 | 0 | SD#1 | 0 | BADR5 | 0 | SD#1 | 0 | SADR1 |
| | D#2 | | | SD#2 | 0 | | | SD#2 | 0 | | | SD#2 | 0 | | | SD#2 | 0 | | | SD#2 | 0 | SADR2 |
| | D#3 | | | SD#3 | 0 | | | SD#3 | 0 | | | SD#3 | 0 | | | SD#3 | 0 | | | SD#3 | 0 | SADR3 |
| | D#4 | | | SD#4 | 0 | | | SD#4 | 0 | | | SD#4 | 0 | | | SD#4 | 0 | | | SD#4 | 0 | SADR4 |
| | D#5 | | | SD#5 | 0 | | | SD#5 | 0 | | | SD#5 | 0 | | | SD#5 | 0 | | | SD#5 | 0 | SADR5 |
| | — | | | SD#6 | 0 | | | SD#6 | 0 | | | SD#6 | 0 | | | SD#6 | 0 | | | SD#6 | 0 | SADR6 |
| | ----- | ----- | ----- | ----- | ----- | ----- | ----- | ----- | ----- | ----- | ----- | ----- | ----- | ----- | ----- | ----- | ----- | ----- | ----- | ----- | ----- | ----- |

FIG. 9

31 ADDRESS TABLE

| LOGICAL GROUP NO | LOGICAL ADDRESS | SCSI DRIVE ADDRESS | | | | | | | | INTER-DRIVE ADDRESS |
|---|---|---|---|---|---|---|---|---|---|---|
| | | DATA | | | | PARITY | | | | |
| | | BOARD ADDRESS | BOARD WITH-DRAWAL | DRIVE No. | FAULT | BOARD ADDRESS | BOARD WITH-DRAWAL | DRIVE No. | FAULT | |
| LG#1 | D#1 | BADR1 | 0 | SD#1 | 0 | BADR4 | 0 | SD#1 | 0 | SADR1 |
| | D#2 | BADR2 | 0 | | | | | | | |
| | D#3 | BADR3 | 0 | | | | | | | |
| | D#4 | BADR2 | 0 | SD#1 | 0 | BADR1 | 0 | SD#1 | 0 | SADR2 |
| | D#5 | BADR3 | 0 | | | | | | | |
| | D#6 | BADR4 | 0 | | | | | | | |
| | D#7 | BADR3 | 0 | SD#1 | 0 | BADR2 | 0 | SD#1 | 0 | SADR3 |
| | D#8 | BADR4 | 0 | | | | | | | |
| | D#9 | BADR1 | 0 | | | | | | | |
| | D#10 | BADR4 | 0 | SD#1 | 0 | BADR3 | 0 | SD#1 | 0 | SADR4 |
| | D#11 | BADR1 | 0 | | | | | | | |
| | D#12 | BADR2 | 0 | | | | | | | |
| | D#13 | BADR1 | 0 | SD#2 | 0 | BADR4 | 0 | SD#2 | 0 | SADR1 |
| | D#14 | BADR2 | 0 | | | | | | | |
| | D#15 | BADR3 | 0 | | | | | | | |
| | D#16 | BADR2 | 0 | SD#2 | 0 | BADR1 | 0 | SD#2 | 0 | SADR2 |
| | D#17 | BADR3 | 0 | | | | | | | |
| | D#18 | BADR4 | 0 | | | | | | | |
| | D#16 | BADR3 | 0 | SD#2 | 0 | BADR2 | 0 | SD#2 | 0 | SADR3 |
| | D#17 | BADR4 | 0 | | | | | | | |
| | D#18 | BADR1 | 0 | | | | | | | |
| | D#16 | BADR4 | 0 | SD#2 | 0 | BADR3 | 0 | SD#2 | 0 | SADR4 |
| | D#17 | BADR1 | 0 | | | | | | | |
| | D#18 | BADR2 | 0 | | | | | | | |

DISC ARRAY SYSTEM HAVING DISC STORAGE DEVICES DISPERSED ON PLURAL BOARDS AND ACCESSIBLE AT WITHDRAWAL OF PART OF THE BOARDS

BACKGROUND OF THE INVENTION

The present invention relates to a disc array system comprising a plurality of disc storage devices that retain a plurality of data together with error correction codes.

In existing computer systems, the data needed by the CPU or by the similar high-order facility is held in a secondary storage device. When necessary, the CPU or its equivalent accesses the secondary storage device to write or read data thereto or therefrom. The secondary storage device generally utilizes a nonvolatile storage medium and typically constitutes a magnetic disc unit or an optical disc unit. Such disc units will each be referred as a disc drive hereunder.

With today's society getting increasingly information-oriented, computer systems require secondary storage devices of correspondingly enhanced performance. One proposed solution to this challenge is a disc array setup composed of numerous disc drives of a relatively small capacity each.

The solution is discussed illustratively by D. Patterson, G Gibson and R. H. Kartz, "A Case for Redundant Arrays of Inexpensive Discs (RAID)," ACM SIGMD Conference, Chicago, Ill, (June 1988), pp. 109–116 (hereinafter referred to as the first prior art). The paper reports on the performance and reliability of disc arrays (at level 3) for dividing data and parallely processing the data divisions and of disc arrays (at levels 4 and 5) for distributing and independently handling data.

The disc arrays at level 3 divide one write data item transferred from the CPU in connection with a write request, and generate parity data for error correction based on the divided data. The data divisions and the parity data are stored parallelly in a plurality of disc drives. When the CPU orders a read operation of the divided data, the data divisions are read parallelly from the appropriate disc drives and are combined for transfer to the CPU.

The disc arrays at levels 4 and 5 differ from those at level 3 in the following two aspects: that the divided data at level 3 are replaced by a plurality of data items that are used in connection with a plurality of write requests transferred from the CPU; and that the data are read in units of data items and, unlike at level 3, are not combined for transfer to the CPU.

The multiple data items and the error correction data generated from such data items are called an error correction data group, a parity group or a parity data group. Because the error correction data may be constituted not only by parity data but also by various other kinds of error correction data, the wording "parity group" is used in this specification even where the error correction data may not be parity data. Although the error correction codes in this specification are composed of parity data, this invention may also be applied to cases where the error correction codes are something other than the parity data.

In the description that follows, a plurality of disc drives accommodating the data of the same parity group are collectively called a logical group. The logical group constitutes a fault recovery unit. If a disc drive of a logical group becomes faulty, the fault can be addressed using the data in the other disc drives within the same logical group. Illustratively, if a disc drive holding divided data has developed a fault and cannot be accessed for reading data therefrom, the data in the faulty disc drive can be reconstructed by use of the data and parity data held in the remaining disc drives of the same logical group. In systems comprising numerous disc drives such as disc array systems, growing numbers of component parts tend to increase the probability of fault. It is for the purpose of enhancing the reliability of disc drives that the parity scheme is employed for recovery from fault.

Also proposed is a scheme whereby all data destined to a faulty drive is written to a spare drive until the faulty drive is replaced by an alternate drive. One such scheme is described in U.S. Pat. No. 5,077,736 (called the second prior art hereunder).

With conventional disc array systems of level 3 (called the third prior art hereunder), a plurality of disc drives are connected by cables to an array controller. In this setup, the drives are connected to the array controller using as many buses as the number of drives constituting each different logical group. That is, the first drive of each of the different logical groups is connected to the array controller via a common first bus, by use of cables such that the first drives make up a daisy chain when connected. The second drive of each different logical group is connected likewise to the array controller via a common second bus, using cables such that the second drives also constitute a daisy chain. The other drives are connected in like manner. Where numerous drives make up the disc array system, the cable-based drive connection is not very desirable because of floor space constraints and of reduced maintainability. What is desired then is a setup having many small drives installed therein.

Japanese Patent Laid-open No. Hei 3-108178 (corresponding to U.S. patent application Ser. No. 409495, filed on Sep. 19, 1989) discloses a technique whereby a plurality of drives each having numerous pins at the bottom are mounted on a semiconductor board (the technique may be called the fourth prior art hereunder). The disclosed technique is aimed at mounting numerous small drives on the board. However, it is not disclosed whether or how these drives constitute logical groups.

Japanese Patent Laid-open No. Hei 4-228153 (corresponding to U.S. patent application Ser. No. 502215, filed on Mar. 30, 1990) discloses a technique whereby a plurality of disc drives are mounted detachably on each of a plurality of boards having common wiring, the drives on one board being called a disc array (the technique may be called the fifth prior art hereunder). The multiple disc drives of each array belong to the same logical group. If any one drive on a given board develops a fault, the board carrying the faulty drive remains inserted in the system and the faulty drive is withdrawn from the board to be replaced by an alternate drive. In this case, the faulty drive remains accessible. Specifically, if a read request is generated to read data from the faulty drive, the data and parity data held in the other disc drives of the same logical group are used to provide the target data to be read.

SUMMARY OF THE INVENTION

With the fifth prior art outlined above, the arrays each comprising a plurality of disc drives are mounted on a common mother board so that numerous small drives are installed at high density. However, if any one drive develops a fault, the faulty drive must be withdrawn from the applicable board for replacement by an alternate drive. To withdraw any faulty drive requires providing a space wide enough for a user to gain manual access to that drive. That space requirement poses limits to arranging numerous drive-carrying boards at short intervals.

It is therefore an object of the present invention to provide a disc array system having a plurality of disc drives mounted on a plurality of boards and getting those boards arranged on a common mother board at relatively short intervals wherein, if a fault occurs in any disc drive, the data held in the faulty drive may still be accessed by an upper device.

In carrying out the invention and according to one aspect thereof, there is provided a disc array system comprising: a mother board; a plurality of boards mounted detachably on one side of the mother board and arranged substantially in parallel; a plurality of disc drives mounted on one side of each of the boards; and an array controller for controlling the writing and reading of data to and from disc drives on the boards via signal lines installed on the mother board; the array controller including: a write circuit for writing a plurality of data items and error correction codes used in connection with these data items to a plurality of disc drives each mounted on a different board; a read circuit used when a board carrying a faulty disc drive is withdrawn from the mother board and when an upper device accesses any disc drive on the withdrawn board for reading a target data item therefrom, the accessed drive being either the faulty disc drive or a normal drive, the read circuit reading a plurality of data items belonging to the same error correction data group as that of the target data item together with the parity data in connection with the read data items, from a plurality of disc drives mounted on a plurality of boards other than the withdrawn board; and a recovery circuit for recovering the target data item from the read data items and from the parity data read in connection therewith.

In a preferred structure according to the invention, the disc array system further comprises a random access memory for temporarily accommodating write data supplied by the upper device for a write operation to any one of the disc drives mounted on the withdrawn board carrying the faulty disc drive; and a write circuit used when the board having an alternate drive mounted thereon for replacing the faulty disc drive and readied for data write operations is again mounted on the mother board, the write circuit writing to the alternate drive the data destined to the faulty disc drive but held in the random access memory, the write circuit also writing to any normal drive on the replaced board the data destined thereto but held in the random access memory, while the board is being withdrawn from the mother board for replacement of the faulty disc drive.

In another preferred structure according to the invention, the disc array system further comprises: at least as many spare drives as the number of data-holding disc drives mounted on a single board separate from the boards carrying the disc drives for holding data; a write circuit used, when the board carrying the faulty disc drive is withdrawn from the mother board, for selecting one spare drive with respect to each of the disc drives mounted on the withdrawn board, the write circuit being further used, when the upper device supplies data to be written to any target disc drive mounted on the withdrawn board, for writing the supplied data to the spare drive selected with respect to the target disc drive; and a write circuit used when the board having an alternate drive mounted thereon for replacing the faulty disc drive and readied for data write operations is again mounted on the mother board, the write circuit writing the data destined to the faulty disc drive to the spare drive selected with respect to the alternate drive.

Other objects, features and advantages of the present invention will become apparent in the following specification and accompanying drawings.

BRIEF DESCRIPTION OF THE DRAWINGS

FIG. 4 is a view of a typical logical group table for use with the circuits of FIG. 3;

FIG. 5 is a view of a typical address table for use with the circuits of FIG. 3;

FIG. 7 is a view of a typical logical group table used by a disc array system practiced as a second embodiment of the invention;

FIG. 8 is a view of a typical address table for use with the second embodiment; and FIG. 9 is a view of a typical address table used by a disc array system practiced as a third embodiment of the invention.

DESCRIPTION OF THE PREFERRED EMBODIMENTS (First embodiment)

(1) Outline of the system

Figure 1:
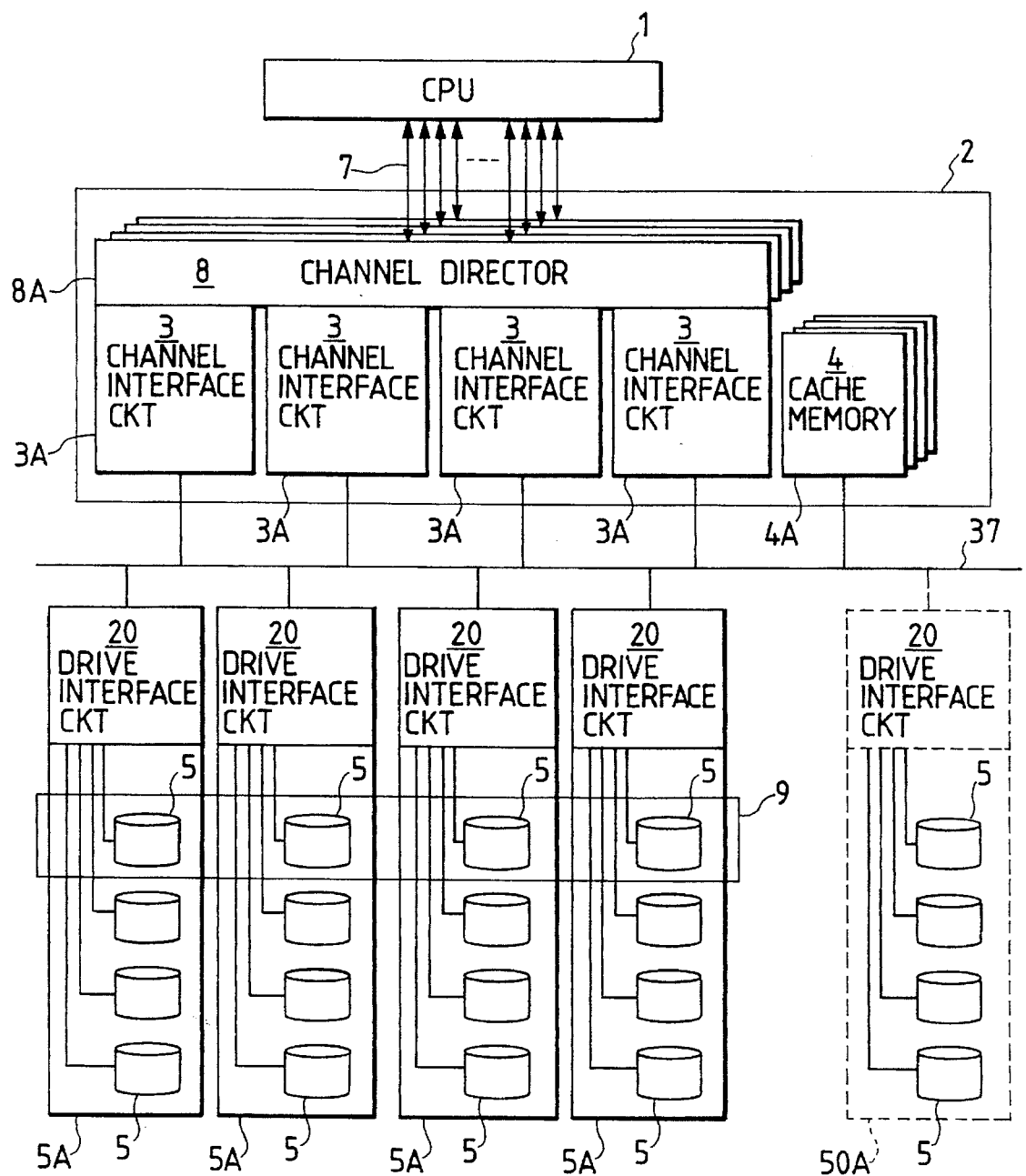
FIG. 1 is a schematic view of a disc array system practiced as a first embodiment of the invention.

FIG. 1 is a schematic view of a disc array system practiced as the first embodiment of the invention. In FIG. 1, the disc array system comprises a plurality of disc drives 5 and an array controller 2 for controlling the operation of these disc drives.

Reference numeral 1 represents a CPU that orders the writing and reading of data externally. The CPU 1 and the array controller 2 are connected by a plurality of channel paths 7. The array controller 2 includes: a plurality of (e.g., 4) channel path director boards 8A carrying distributed channel path directors 8 for selecting channel paths 7; a plurality of (e.g., 4) channel path interface boards 3A carrying channel interface circuits 3 for controlling data transfer to and from the CPU 1; a plurality of (e.g., 4) cache memory boards 4A carrying distributed cache memories 4 which are nonvolatile semiconductor memories backed up by batteries; and a bus 37 for connecting the cache memory boards 4A with the channel interface boards 3A. The bus 37 is also connected to a plurality of (e.g., 4) drive boards 5A each retaining a plurality of disc drives 5 and a drive interface circuit 20.

Figure 2A:
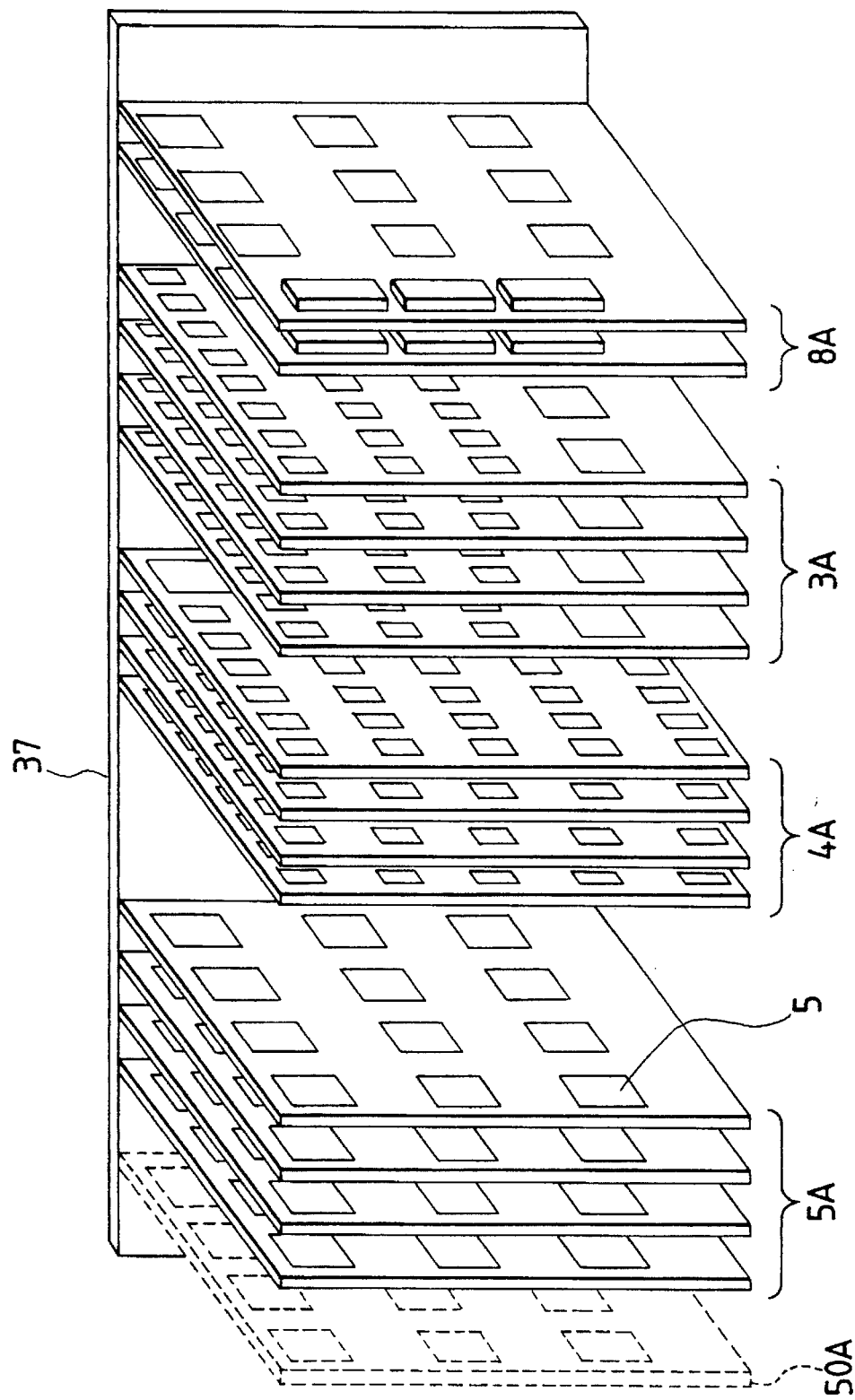
FIG. 2A is a view showing the arrangement of boards in the first embodiment of FIG. 1.

FIG. 2A illustrates the arrangement of boards in the first embodiment of FIG. 1. As shown, the boards described above are mounted on a common mother board 37. In FIG. 2A, rectangles 370 indicated on each board represent an LSI chip each. It should be noted that only a part of the rectangles 370 on the drive board 5A are LSI chips; the remaining majority 5 are the disc drives mounted on that board. The mother board 37 comprises board connector groups 30A, 40A, 50A and 80A indicated in FIG. 2B. It is by means of these connectors that the boards are inserted detachably in the mother board. The boards are arranged substantially in parallel with one another.

The surface of the mother board supports the bus 37 for connecting the channel interface connector group 30A, the cache memory connector group 40A, and the drive board connector group 50A. Also provided are signal lines 12 (FIG. 3) for connecting the channel director connector group 80A with the channel interface connector group 30A.

One characteristic of the first embodiment lies in the fact that, when a fault has occurred in a disc drive on a drive board, that drive board together with its normal drives is withdrawn from the mother board 37 (i.e., the faulty drive not detached from the drive board) for replacing the faulty drive with an alternate drive, the drive board along with the alternate drive being replaced onto the mother board 37. The point is that if any disc drive has developed a fault, the drive board carrying the faulty drive need only be withdrawn from the mother board and inserted therein again after replacement of the faulty drive. This makes it possible to reduce the spacing between drive boards when they are mounted. Another characteristic of the first embodiment is that a plurality of disc drives mounted in a distributed manner on a plurality of drive boards constitute a logical group. Thus when any drive board is withdrawn from the mother board, the data held in any of the disc drives on the detached board may be recovered from the data and parity data held in the other drives mounted on the other drive boards within the same logical group.

The logical group 9 is made up of m drives 5 (illustratively four drives in the first embodiment) mounted on a plurality of (e.g., 4) boards. The logical group 9 is a fault recovery unit comprising the disc drives 5 that retain m–1 error correction data groups (i.e., parity groups) composed of data and the parity data derived therefrom.

Although the first embodiment comprises four channel interface boards 3 and four drive interface boards 6, the numbers of these components are not limitative of the invention. Likewise, the number of disc drives 5 mounted on each board and the number of disc drives 5 constituting one logical group 9 are not limitative of the invention; these counts may be selected as desired.

Figure 3:
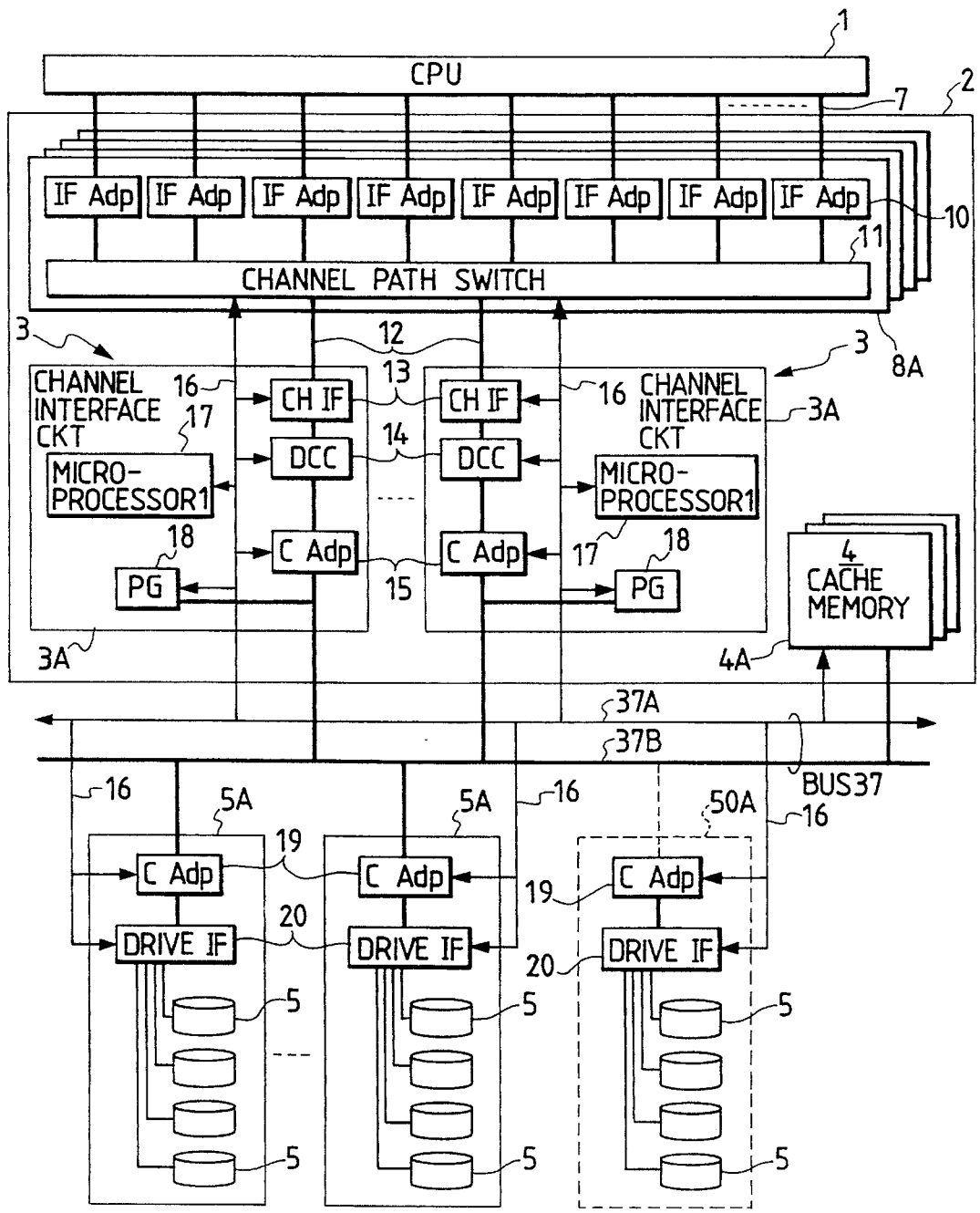
FIG. 3 is a detailed circuit diagram of circuits in the first embodiment.

FIG. 3 is a detailed circuit diagram of each board in the first embodiment. The channel path directors 8 include interface adapters (IF Adp) 10 connected to the respective channel paths 7 and a channel path switch 11. Although the channel path directors 8 are actually mounted in a distributed manner on four boards, FIG. 3 provides a comprehensive diagram of the entire circuitry constituting the directors 8.

The channel interface circuits 3 each comprise: a channel interface (CH IF) 13 for effecting protocol conversion and transfer rate adjustment regarding the data transferred from the CPU 1; a data control circuit (DCC) 14 for controlling data transfer; a channel-side cache adapter (C Adp) 15 for controlling the writing of data sent from the CPU 1 into the cache memory 4; a parity generator 18 for generating parity data from the divided data written to the cache memory 4; and a microprocessor (MP) 17 for controlling the configured circuits. The channel interfaces 13 are connected to the channel path switch 11 via data lines 12. The cache adapters 15 control the bus 37 as well as the transfer of data between the CPU 1 and the cache memories 4.

The drive board 5A includes a drive-side cache adapter (C Adp) 19 and a drive interface circuit (Drive IF) 20. Reference numeral 16 represents control signal lines that connect the channel path switch 11, the channel interfaces 13, the data control circuits 14, the channel-side cache adapters 15, the microprocessors 17, the cache memories 4, the drive-side cache adapters 19 and the drive interface circuits 20. The bus 37 comprises a control bus 37A for transferring control information and a data bus 37B for transferring data.

In FIGS. 1 and 3, the board 50A is for use with the second embodiment to be described later. That is, the board 50A carries spare drives 5.

(2) Outline of the system operation in the absence of faulty disc drives

The internal workings of the first embodiment will now be described with reference to FIG. 3. The first embodiment works primarily on the so-called RAID 3 control principles.

The CPU 1 first issues a read or write command. The command is input to a channel path director 8 in the array controller 2 via the channel paths 7.

Given the command from the CPU 1, the channel path director 8 in the array controller 2 checks to see if the command is acceptable. When the command is found to be acceptable, that command sent from the CPU 1 to the array controller 2 is input to the interface adapter (IF Adp) 10. The microprocessor (MP) 17 performs command acceptance processing. The first embodiment writes and reads data primarily in accordance with the conventional RAID level 3 scheme.

Figure 6:
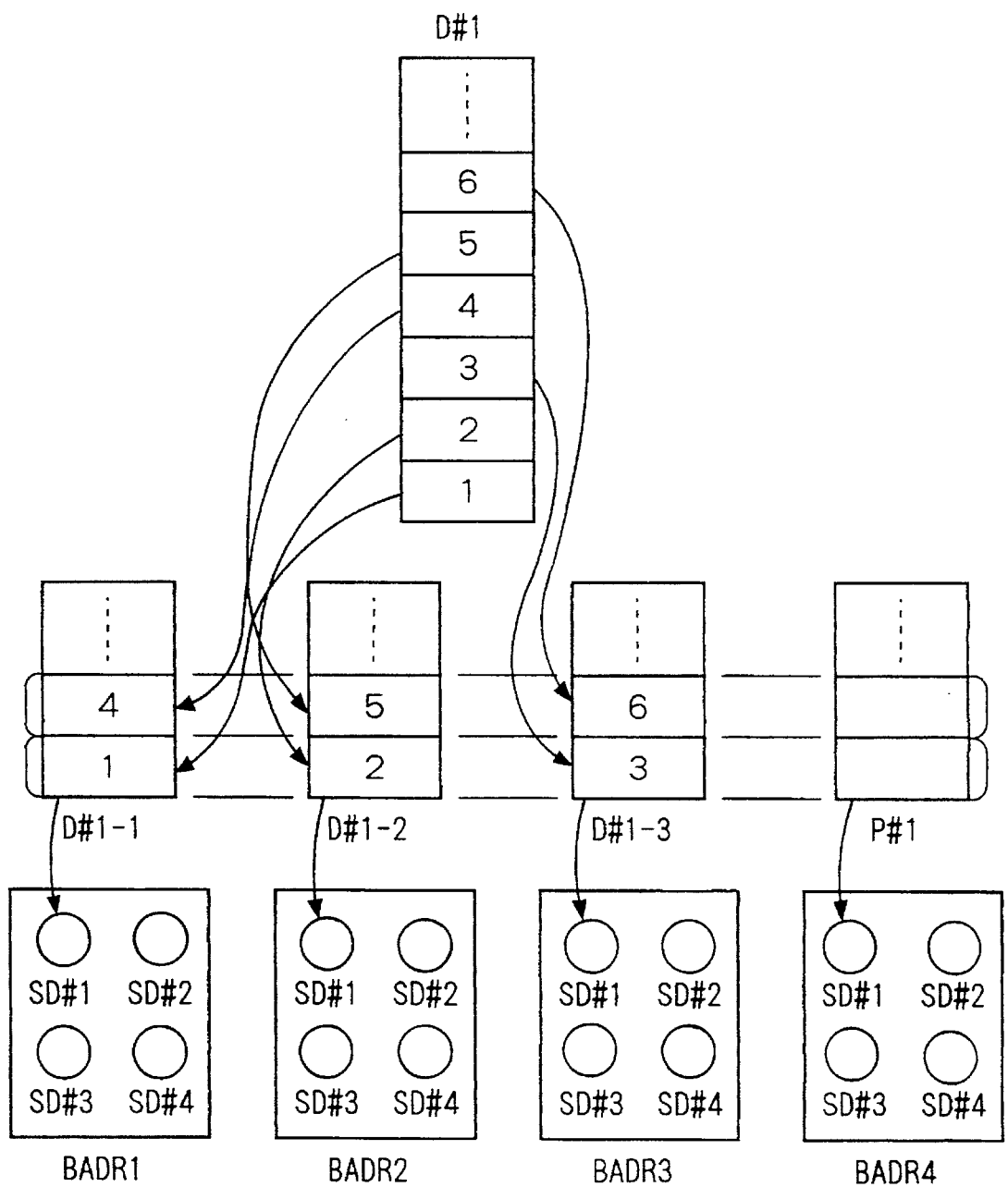
FIG. 6 is a view illustrating how the first embodiment writes data.

FIG. 6 depicts how the first embodiment writes data as per the RAID level 3 scheme. In FIG. 6, reference characters BADRi (i=1, 2, 3 or 4) represent the board addresses of four drive boards 5A. Reference characters SD#1 (i=1, 2, 3 or 4) denote the drive address specifying one disc drive on each of the boards.

In the description that follows, the board whose board address is, say, BADR1 is called the board BADR1. Likewise the drive whose drive address is SD#1 on a board is called the drive SD#1.

The drives SD#1 on the boards BADR1 through BADR4 are assumed to constitute a logical group. It is also assumed that the disc drives on the board BADR4 are used to store parity data and that the disc drives SD#1 on the other boards BADR1 through BADR3 are used to accommodate data.

It is further assumed that the command from the CPU 1 is a data write command and that the write data sent from the CPU 1 is represented by D#1 in FIG. 6. D#1 is a logical address that specifies the write data. The data specified by the logical address D#1 will be called the data D#1 hereunder.

With the first embodiment, the length of the data written or read by the CPU 1 is assumed to be fixed at 4 KB. Thus the write data D#1 from the CPU 1 is 4 KB long. It should be noted that the data length is not limitative of the invention; any other appropriate data length may be adopted for the invention.

The write data D#1 from the CPU 1 is held in the cache memories 4 in FIG. 1. Under the RAID 3 scheme, the write data D#1 thus accommodated is divided into single-byte data units from the beginning of the data, and the data units are distributed to the three data storage drives (SD#1 on BADR1, BADR2 and BADR3) out of the four constituting the logical group. The divided data units are called sub data having sub data names D#1-1, D#1-2 and D#1-3. The sub data whose sub data name is D#1-1 will be called the sub data D#1-1 hereunder. Parity data is generated from the sub data following the division. Parity data generation involves processing the corresponding bytes of the sub data. Specifically, the first byte of the sub data D#1-1, the first byte of the sub data D#1-2 and the first byte of the sub data D#1-3 are computed to give a parity data item; the second byte of the sub data D#1-1, the second byte of the sub data D#1-2 and the second byte of the sub data D#1-3 are computed to furnish another parity data item; and so on. The parity data items thus generated are arranged consecutively to constitute parity data P#1.

The sub data D#1-1, D#1-2, D#1-3 and the parity data P#1 are written in a distributed manner to the four disc drives making up the logical group. The data from the CPU 1 is written in the above-described manner.

When the CPU 1 issues a data read request, the logical group holding the requested data is accessed for reading therefrom the sub data constituting the target data. These sub data are combined and transmitted via the cache memories 4 to the CPU 1.

(3) Address translation table

The address translation table necessary for the above-described writing and reading of data will now be described in detail.

For the disc drives 5 constituting the disc array system, the first embodiment adopts SCSI interface drives. In addition, the CPU 1 of the first embodiment issues write and read commands without getting aware of disc arrays. That is, the CPU 1 is not aware whether the disc drives to which to issue commands are of conventional type or are part of a disc array system. This is because the disc drives widely used today are of conventional type so that the operating systems (OS) are not designed to be aware of disc arrays. Thus with the first embodiment, the CPU 1 operates on the assumption that it writes and reads data to and from conventionally configured disc drives; the disc array system carries out its own processing associated with disc arrays. For this reason, the CPU 1 issues write and read commands using a conventional interface arrangement.

More specifically, when the CPU 1 sends a data write command to the array controller 2, the CPU 1 transfers the target write data together with its logical address (data name or data number). The array controller 2 divides the write data into sub data as described with reference to FIG. 6, and stores these sub data as well as the associated parity data to the disc drives of the logical group 9. At this time, the sub data and parity data are given addresses (D#1-1 through D#1-3, P#1, etc. as explained by referring to FIG. 6) for processing by the array controller 2. The logical address furnished by the CPU 1 and the addresses prepared by the array controller 2 are matched in what is known as the address translation table, to be described below.

When the CPU 1 issues a data read command to the array controller 2, the CPU 1 furnishes the array controller 1 with the applicable logical address for a read operation by the latter. Using the address translation table, to be described below, the array controller 2 translates the furnished logical address into appropriate addresses used within the disc array system. These addresses are referenced in order to read the sub data which are then combined and transferred to the CPU 1.

The address translation table is constituted by a logical group table 21 and an address table 31.

FIG. 4 illustrates a typical structure of the logical group table 21. Logical addresses 22 are each an address designated by the CPU 1 (i.e., data name or data number). Sub data names 24 are acquired by dividing data having a given logical address 22. Parity data names 25 are prepared on the basis of the corresponding sub data. Logical group numbers 23 are each the number of a logical group 9 that currently stores or is expected to store the sub data and parity data.

In an initial state of the address translation table in which no data is written, the column of logical group numbers 23 has predetermined logical group numbers set therein as initial values. In the initial state, the columns of logical addresses 22, of sub data names 24 and of parity data names 25 are all left blank in the table.

FIG. 5 depicts a typical structure of the address table 31. The address table 31 retains detailed address information about what data has been (or is to be) written in which location of which drive belonging to which logical group.

Logical addresses 22 in the address table 31 of FIG. 5 are the same as the logical addresses 22 in the logical group table 21 of FIG. 4. These are logical addresses (data names or data numbers) each designated by the CPU 1. Logical group numbers 23 in the address table 31 of FIG. 5 are the same as the logical group numbers 23 in the logical group table 21 of FIG. 4. Reference numeral 30 represents SCSI drive address information about the SCSI drive to which data of the corresponding logical addresses has been (or is to be) written.

The SCSI drive address information 30 comprises four columns of address information. Each column includes a board address 27, drive numbers 28, fault flags 29 and a board withdrawal flag 100. The board withdrawal flag 100 indicates whether or not the board having the listed address is withdrawn from the mother board. Reference numeral 32 denotes inter-drive addresses each indicating what data has been (or is to be) written in which location of which drive. A board address 27, a drive number 28 and an inter-drive address 32 corresponding to a given logical address 22 combine to denote the location to which the data at that logical address 22 (sub data and parity data) has been (or is to be) written in which drive on which board.

The board withdrawal flag 10 for each board is set to 1 when that board is withdrawn from the mother board 37. When withdrawing a board, the user gets the CPU 1 to issue to the array controller 2 a command indicating that the board has been withdrawn. Responding to the issued command, the microprocessor 17 sets the board withdrawal flag 10 corresponding to the indicated board. Later, when the detached board is replaced onto the mother board, the user also gets the CPU1 to notify the array controller 2 using a command that the board in question has been replaced. In response, the array controller 2 performs recovery processing, to be described later, and resets the board withdrawal flag 100 corresponding to the replaced board.

The fault flag 29 indicates whether or not the corresponding disc drive has developed a fault. That is, a fault flag 29 remains off (at 0) when everything is normal, and is turned on (i.e., set to 1) if the corresponding disc drive on the corresponding board has developed a fault and is inaccessible for read or write operations thereto.

The four columns under the SCSI drive address information 30 correspond respectively to the columns under the sub data name 24 and to the column under the parity data name 25 in the logical group table 21 of FIG. 4.

Because the first embodiment has its data stored in parallel in a plurality of regions having the same inter-drive address 32, it is preferable to synchronize the revolutions of all disc drives 5 within the same logical group 9.

As described, the first embodiment reads and writes data using the address table 31 and logical group table 21.

(4) System operation upon disc drive fault

With the first embodiment, as shown in FIG. 6, each logical group 9 comprises a plurality of disc drives mounted on a plurality of boards (e.g., BADR1, BADR2, BADR3, BADR4). The address translation tables depicted in FIGS. 4 and 5 indicate which disc drives on which boards constitute what logical group, the indication being given by having the address of each disc drive supplemented with the applicable board address.

Suppose that the first embodiment attempts a number of times to access a disc drive on, say, the board BADR1 for writing or reading data thereto or therefrom. If a predetermined number of retries turn out to be unsuccessful, the microprocessor 17 recognizes a fault of the board BADR1 and, in the address table 15, turns on (i.e., sets to 1) the fault flag 29 corresponding to the disc drive SD#1 on the board BADR1. With the disc drive SD#1 in defective state, the disc array system remains operational even if the mother board 37 still retains the board BADR1 carrying that faulty drive or if the defective board is detached from the mother board 37 for repair.

Specifically, when the CPU 1 issues a data read request pertaining to data held in any of the disc drives SD#1 on the boards BADR1–BADR4, the microprocessor 17 checks the address table 15. In the manner described in connection with the address translation table, the microprocessor 17 translates the logical address designated by the CPU 1 into the address applicable within the disc array system. At this point, the microprocessor 17 checks two flags: the fault flag 29 corresponding to the disc drive SD#1 on the board (BADR1 in the above example) to which the translated address is assigned, and the board withdrawal flag 100 corresponding to the board carrying that disc drive. If the fault flag 29 regarding the disc drive SD#1 is found to be on (i.e., set to 1) and if the board withdrawal flag 100 applicable to the board BADR1 carrying that disc drive is off (set to 0), the microprocessor 17 recognizes two things: that the disc drive in question has developed a fault, and that the board BADR1 carrying that drive is still held inserted in the mother board 37.

Having recognized the faulty disc drive in the above manner, the microprocessor 17 recovers the data in the disc drive SD#1 on the board BADR1 through the use of the data and parity data associated with the logical group to which the drive in question belongs. Specifically, the microprocessor 17 retrieves a plurality of sub data and parity data from the drives SD#1 on the other boards BADR2–BADR4. Using the retrieved sub data and parity data, the microprocessor 17 gets the internal parity generator 18 to recover the sub data in the faulty disc drive SD#1. The recovered sub data is combined with the multiple sub data retrieved earlier so as to generate the requested data which is then sent to the CPU 1. It is by a known technique that the parity generator 18 recovers the data in the faulty disc drive SD#1.

As described, the parity generator (PG) 18 generates parity data from sub data when target data is written to disc drives. When the sub data is recovered from both sub data and parity data, on the other hand, the parity generator 18 acts as a data recovery circuit.

If the board withdrawal flag 100 corresponding to the board BADR1 carrying the disc drive SD#1 is found to be on (set to 1), the microprocessor 17 recognizes that the board BADR1 has been withdrawn from the mother board 37. In that case, the microprocessor 17 is unable to read data from all disc drives, with or without fault, mounted on the board BADR1. Thus in the same manner as that of handling the faulty drive SD#1 described above, the microprocessor 17 recovers data in the unsuccessfully accessed drive from the data in the other disc drives belonging to the same logical group.

If the CPU 1 issues a data write request for updating data in the disc drive SD#1, the microprocessor 17 checks the address table as in the case of the read request. Following the procedure discussed in connection with the address translation table, the microprocessor 17 translates the logical address designated by the CPU 1 into the address applicable within the disc array system. At this point, the microprocessor 17 checks the fault flag 29 corresponding to the disc drive in question and the board withdrawal flag 100 applicable to the board carrying that disc drive.

If the fault flag 29 corresponding to the disc drive SD#1 is found to be on (set to 1) and if the board withdrawal flag 100 applicable to the board BADR1 carrying the disc drive SD#1 is off (set to 0), the microprocessor 17 recognizes that the disc drive SD#1 has developed a fault and that the board BADR1 carrying that drive SD#1 stays inserted in the mother board 37. In that case, the microprocessor 17 accommodates the write data inside the cache memories 4.

Later, when the disc drive SD#1 on the detached board BADR1 is repaired and the board BADR1 is replaced onto the mother board 37, the microprocessor 17 reads the sub data and parity data belonging to all error correction data groups of the other disc drives that belong to the same logical group as that of the normal alternate disc drive replacing the faulty drive (drive SD#1 on the board BADR1 in this example). Using the sub data and parity data thus read, the microprocessor 17 recovers all data in the faulty disc drive. The recovered data is stored in the normal alternate disc drive replacing the faulty drive.

Thereafter, the multiple write data held in the cache memories 4 are written to the alternate disc drive or to the other appropriate normal drives on the board BADR1. The writing of these write data is carried out under the RAID 3 scheme. That is, each write data item is divided into a plurality of sub data from which parity data is generated. One of the plurality of sub data is written to one disc drive on the board; the other sub data and the parity data generated above are written to a plurality of disc drives on the other boards.

When the detached board BADR1 is replaced onto the mother board 37, the above-described scheme recovers all data in the normal drives on the replaced board BADR1. The scheme also recovers the data for which no write request was made while the board BADR1 was withdrawn from the mother board 37. This scheme is effective where most of the data in the normal drives has been updated in response to numerous write requests issued while the board BADR1 was detached. However, the scheme takes time needlessly for recovery processing if it recovers the write data already held in the normal drives for which few write requests were issued while the board BADR1 was withdrawn from the mother board 37.

This flaw is circumvented by not recovering the write data already held in the normal drive for which only a small number of write requests were issued while the board BADR1 was detached. Instead, only the data designated by the write requests from the upper device with the board detached are recovered.

If the board withdrawal flag 100 regarding the board BADR1 carrying the disc drive SD#1 is found to be on (set to 1), the microprocessor 17 recognizes that the board BADR1 has been withdrawn from the mother board 37. In that case, the microprocessor 17 is unable to write data to all drives, with or without fault, on the board BADR1. Thus in the same manner as that of handling the faulty drive SD#1 described above, the microprocessor 17 places in the cache memories 4 the data to be written to that drive SD#1.

Later, when the disc drive SD#1 on the board BADR1 is replaced by a normal alternate drive and the board BADR1 is mounted back onto the mother board 37, the microprocessor 17 reads the sub data and parity data belonging to all error correction data groups of the other disc drives that belong to the same logical group as that of the normal alternate disc drive replacing the faulty drive. Using the sub data and parity data thus read, the microprocessor 17 recovers all data in the faulty disc drive and writes the recovered data to the alternate disc drive. Thereafter, the write data held in the cache memories 4 is written to its appropriate destination.

With the first embodiment, it is impossible to access all normal drives on the board BADR1 as long as that board is detached from the mother board 37. While the board BADR1 carrying the faulty drive remains withdrawn from the mother board, it is necessary to write or read data to or from any of these normal disc drives in the same manner as with the faulty drive. However, when a data write request is issued to one of the normal drives on the detached board and the board is later replaced onto the mother board 37, it is not necessary to recover the data in the target normal drive as has been the case with the normal drive having replaced the faulty drive. This is because the target normal drive not having replaced the faulty one keeps intact its data held before the board was withdrawn.

Because the newly generated write data is retained in the cache memories 4, the write data generated while the board was being detached from the mother board 37 is easily written to any normal disc drive on the replaced board.

Because the cache memories 4 hold the write data, a read request that may be issued later by the CPU 1 to read the retained data causes them to be read from the cache memories 4 for direct transfer to the CPU 1. This effectively amounts to increasing the data read speed.

As described, where a drive board carrying a faulty disc drive is withdrawn from the mother board, the first embodiment can continuously handle data read and write requests destined to the faulty disc drive.

(First variation of the first embodiment)

Where a board carrying a faulty disc drive (i.e., SD#1) is detached from the mother board, a data write request issued by the CPU 1 to write data to the faulty drive SD#1 (or to any other normal disc drive on the same board) may be processed alternatively as follows:

The write data is divided into sub data and parity data is generated in conjunction therewith, in the same manner as when the board BADR1 is still attached to the mother board. When the board BADR1 is withdrawn from the mother board, the sub data or the newly generated parity data is written to the disc drives SD#1 or to other drives on the boards BADR2–BADR4 other than the board BADR1 carrying the faulty drive SD#1 (or other normal drives); the data-receiving disc drives here constitute the logical group to which the faulty drive SD#1 (or other normal drives) on the board BADR1 belongs. The sub data to be written to the drive SD#1 or to other normal drives on the detached board BADR1 is discarded.

Later, when the board BADR1 is again inserted in the mother board 37, data is recovered for all drives mounted on the replaced board BADR1 as in the case of the first embodiment. In this recovery process, the initial data in the faulty drive and the write data furnished to service the write request issued while the board is being detached are recovered inside the alternate drive replacing the faulty drive on the board in question. At the same time, it is also possible to recover in the normal disc drives on the same board the data held by these normal drives since before the occurrence of the fault as well as the write data generated in connection with the write request issued while the board was being detached.

With the first variation of the first embodiment, it takes time to recover all data in the disc drives if the drives are numerous on the detached board. However, one advantage of the first variation is that there is no need to retain the new write data in the cache memories 4 as has been the case with the first embodiment. This means that the cache memories 4 may be reduced in size.

(Second variation of the first embodiment)

Suppose that, as in the case of the first variation of the first embodiment, the CPU1 issues a data write request while the board BADR1 carrying the faulty drive is being withdrawn from the mother board. In that case, the data is divided into a plurality of sub data and parity data is generated in conjunction therewith. Of these sub data, those other than the sub data destined to the disc drives on the board BADR1 along with the generated parity data are written to a plurality of disc drives on different boards other than the board BADR1. The difference between the first and the second variation of the first embodiment is that with the second variation, if one of the sub data is destined to any normal disc drive on the board BADR1, that sub data is retained in the cache memories 4. Later, when the board BADR1 is replaced onto the mother board, the second variation of the first embodiment recovers all data to be held in the alternate disc drive that replaces the faulty drive on the board BADR; the recovery of the data is achieved by use of the data in the other drives. The sub data in the cache memories 4 is written to the normal drives on the board BADR1 as in the case of the first embodiment.

The second variation of the first embodiment requires a smaller quantity of sub data to be held in the cache memories 4 than the first embodiment. When the board BADR1 is replaced onto the mother board, the second variation has no need for the recovery of data for the normal drives on the board BADR1 as carried out by the first variation.

(Third variation of the first embodiment)

Whereas the first embodiment uses the bus 37 as a high-speed bus for shared use by a plurality of drive boards, another alternative is to utilize a dedicated bus arrangement that connects each drive board to the array controller 2 on a one-to-one basis. Such a dedicated bus arrangement allows a plurality of disc drives 5 to operate parallelly on a concurrent basis.

(Second embodiment)

Figure 2B:
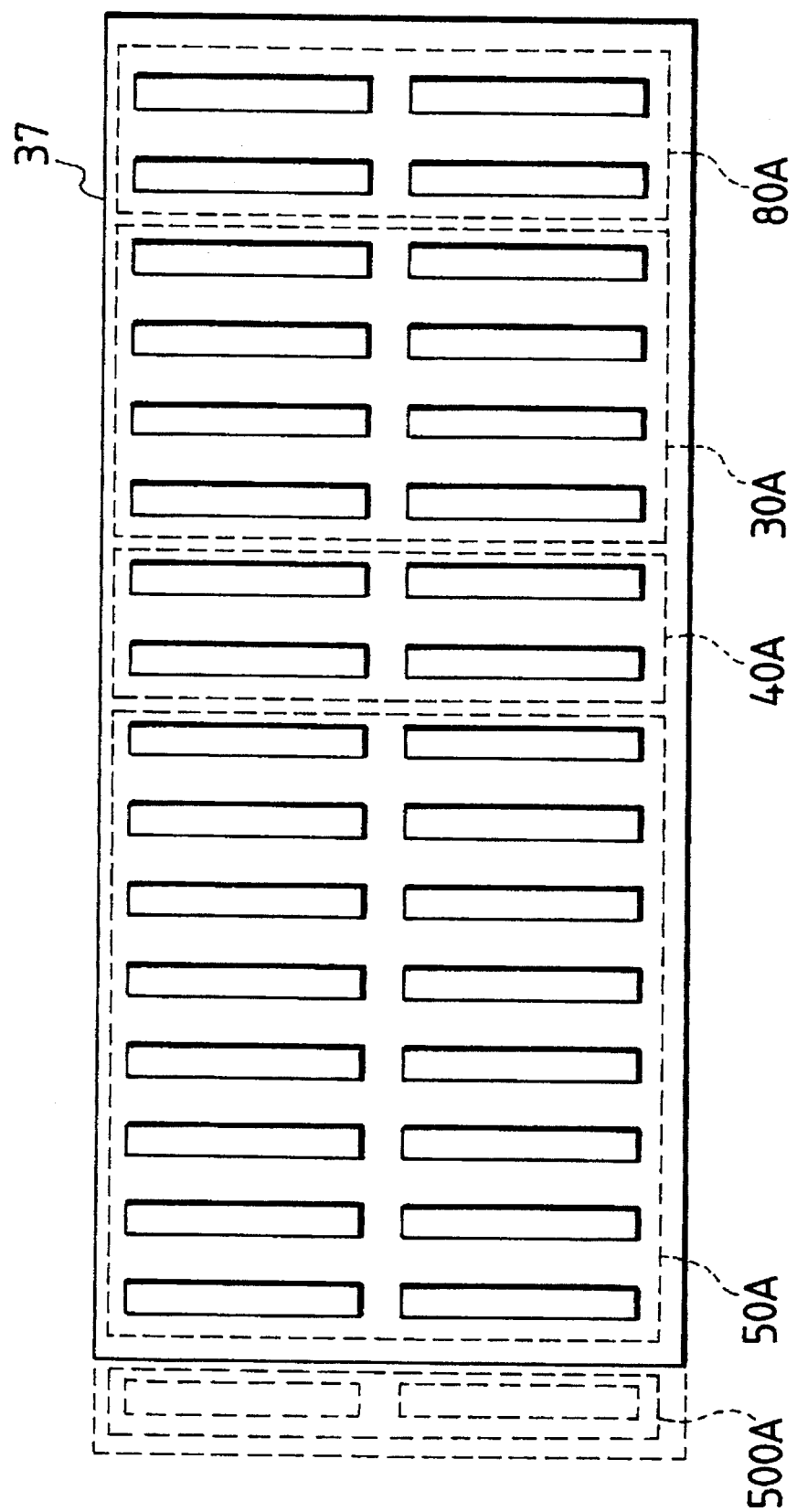
FIG. 2B is a view depicting connectors mounted on the mother board of the first embodiment.

The second embodiment is a modification of the first embodiment as it is supplemented by a spare board 50A shown by broken line in FIG. 1 or 3. In FIG. 2B, a spare board connector is designated as 500A. The spare board 50A is identical in structure to the other drive boards. The spare board carries the same number of disc drives as each of the other boards. With the second embodiment, each spare drive corresponds to each of a plurality of logical groups constituted by the drives on the other multiple boards. If any one drive of a given logical group develops a fault, the spare drive corresponding to that group replaces the faulty drive. In the description that follows, any drive board other than the spare board will be assigned a number BADRi (i=1, 2, 3 or 4) as in the first embodiment, and the spare board will be given a board number BADR5.

With the spare drives furnished as outlined, the logical group table 21 in FIG. 4 for the first embodiment is replaced by the logical group table 21 in FIG. 7 for the second embodiment. The logical group table 21 in FIG. 7 includes a data name column 26 for holding the names of the data to be stored in the spare drives. The address table 31 in FIG. 5 for the first embodiment is replaced by the address table 31 in FIG. 8 for the second embodiment. The address table 31 of FIG. 8 differs from that of FIG. 5 in that the total number of drives constituting each logical group is 5 including one spare drive.

Described below are the workings of the second embodiment in effect when any disc drive develops a fault. It is assumed that, as an example, the drive SD#1 on the board BADR1 has developed a fault.

(A) System operation related to the faulty drive (A1) Where the board carrying the faulty drive is still inserted in the mother board (A1a) Reading data from the faulty drive Suppose that, while the board BADR1 carrying the faulty drive is still inserted in the mother board 37, the CPU 1 has issued a data read request for reading data partially including the sub data held in the faulty drive. In that case, as with the first embodiment, the second embodiment recovers the sub data in the faulty drive from the sub data and parity data in the other drives belonging to the same logical group as that of the faulty drive. In recovering the target sub data, the second embodiment reads the sub data from the drives SD#1 on the boards BADR2 and BADR3 as well as the parity data from the drive SD#1 on the board BADR4. The recovered sub data is combined with the other two retrieved sub data for transfer to the CPU 1.

The subsequent workings make the second embodiment different from the first. Specifically, the recovered sub data is written to the spare drive furnished for the logical group in question, i.e., to the drive SD#1 on the board BADR5 in the above example. Thereafter, the spare drive takes over from the faulty drive in dealing with that particular sub data. That is, if the CPU 1 issues another data read request for reading the data designated by the preceding data read request, or if the CPU 1 issues a data update request regarding the same data, the read or write operation is carried out on the four normal disc drives including the spare drive.

Needless to say, address SADR1 of the spare drive SD#1 on the spare board BADR5 is updated appropriately in the address table 31A so that the spare drive SD#1 will take over from the faulty drive.

As is clear from the description above, the use of spare drives allows the second embodiment to dispense with recovering sub data if the data once accessed is again accessed, whereas sub data recovery is required of the first embodiment. And unlike the first embodiment, the second embodiment in updating the data may execute the write request without retaining the write data in the cache memories 4.

(A1b) Write operation on the data in the faulty drive

Suppose that, where a board carrying a faulty drive is mounted on the mother board 37, the CPU 1 issues a data write request for the data including the sub data held in the faulty drive. In that case, unlike the first embodiment, the second embodiment executes the write request immediately.

That is, as in the case of the normal write operation, the write data is divided into three sub data and parity data is generated in conjunction therewith. The difference from the normal write operation is that, of these sub data, the sub data to be written to the faulty drive SD#1 on the board BADR1 is written to the drive SD#1 on the spare board BADR5.

Needless to say, the address table 31A is updated appropriately so that the spare drive SD#1 will take over from the faulty drive.

(A2) System operation in effect when the board carrying a faulty drive is detached from the mother board In this case, the operations for writing and reading data to and from the faulty drive are the same as the data read operation (A1a) and as the data write operation (A1b) with the faulty drive mounted on the mother board.

(A3) System operation in effect when the board carrying a faulty drive is replaced onto the mother board Where the board BADR1 with its faulty drive replaced by a normal drive is inserted back into the mother board 37, the second embodiment recovers the data in the initial faulty drive in the same manner as with the first embodiment. The recovered data is written to the normal disc drive that has replaced the faulty drive. During recovery, there is no need to use the data held in the spare drives. This scheme also makes it possible to recover the data written anew from the CPU 1 after the fault occurred in the drive.

It may happen that a faulty drive on the spare board BADR5 is replaced by another spare drive. In that case, the new spare drive will thereafter replace any of the other drives constituting the same logical group if the latter drive has developed a fault.

(B) System operation related to the normal drives on the board carrying the faulty drive (B1) Where the board having the faulty drive is mounted on the mother board As in the case of the first embodiment, the normal drives on the board carrying the faulty drive are used as they are continuously.

(B2) System operation in effect when the board carrying the faulty drive is detached from the mother board In this case, the normal drives on the board carrying the faulty drive cannot be accessed. This makes it necessary to carry out the operation described in (A1) above in connection with the workings of the faulty drive.

(B3) System operation in effect when the board carrying the faulty drive is replaced onto the mother board Of all the data held in any normal drive on the detached board carrying the faulty drive, the initial data in that normal drive to which a write request has been issued after withdrawal of the board from the mother board cannot be used. As mentioned earlier, the data generated in response to the write request and destined to be written to the normal drive is already written in the spare drive corresponding to that normal drive. When the board that had the faulty drive is replaced onto the mother board 37, the effective data held in the spare drive corresponding to the normal drive in question is moved to the now normal drive on the same board. This completes the recovery of the data for any normal drive on the detached board having carried the faulty drive.

If the CPU 1 issues a read request regarding data in a normal drive on the currently detached board carrying the faulty drive, the data in that normal drive is recovered and placed in the spare drive corresponding to that normal drive, as described. Thus the data recovered in response to such a read request is also moved from the spare drive to the normal drive. It should be noted, however, that the data thus recovered in response to the read request is the same as the data held initially in the normal drive. Thus the above movement of the data leaves intact the data in the normal drive.

Unlike the first embodiment, the second embodiment has spare drives that accommodate the data recovered in response to the read request issued by the CPU 1 while the drive board in question was being detached from the mother board 37. This means that if the CPU 1 later requests any of the data in the spare drives, the data is immediately available. As opposed to the first embodiment that holds write data in the cache memories 4, the second embodiment accommodates write data in the spare drives. The second embodiment thus can retain much more write data than the first embodiment.

(Variations of the second embodiment)

A number of variations of the second embodiment discussed below may be conceived in connection with the recovering of data after the board that had a faulty drive is replaced onto the mother board.

(1) Variations of the second embodiment in connection with the recovery of data in the faulty drive (1a) With the above-described second embodiment, all data to be retained in the drive having replaced the faulty drive is recovered by use of a plurality of sub data and parity data in the other drives within the same logical group to which the faulty drive belongs. The data thus recovered is stored in the drive that has replaced the faulty drive.

The spare drive that replaces the faulty drive already contains part of the data to be held in the faulty drive. Thus when the second embodiment is to recover data destined to the drive that has replaced the faulty data, the data other than that in the spare drive may be recovered and stored in the drive having replaced the faulty one; the data already retained in the spare drive is moved to the drive that took over from the faulty drive. The scheme of this variation achieves data recovery more quickly than the second embodiment. This scheme is effective where the spare drive contains large quantities of data.

(1b) With the second embodiment, when the board that had the faulty drive is replaced onto the mother board, the data destined to be held in the initial faulty drive is restored into the drive that has replaced the faulty drive. The spare drive used for the faulty drive is released anew as a spare drive. This scheme may be replaced by another alternative scheme whereby the data to be held in the faulty drive is recovered and written to the corresponding spare drive, the spare drive being used thereafter as a normal drive. In that case, of all data to be retained in the initial faulty drive, the data yet to be stored in the spare drive may selectively be recovered and written to the latter drive. This procedure is preferred because it shortens the time required for data recovery.

This alternative scheme is effective where a significant portion of the data to be held in the initial faulty drive is already retained in the spare drive.

(1c) With the second embodiment, when the upper device issues a read request regarding data in the faulty drive, the issuance of the request causes the data to be recovered and stored into the corresponding spare drive. Alternatively, the process of storing the recovered data into the spare drive may be omitted. That is, the spare drive retains only the write data supplied by the upper device while the board carrying the faulty drive is being detached from the mother board. Obviously, after the board is replaced onto the mother board, the data in the faulty drive may be recovered and placed in the spare drive which in turn may be used in place of the faulty drive.

(1d) Another alternative is that, if any drive develops a fault, the upper device may immediately inhibit access to the disc array in question. When all data in the faulty drive is recovered and stored in the corresponding spare drive, the spare drive may be used in place of the faulty drive.

(2) Variations of the second embodiment in connection with normal drives on the board carrying a faulty drive (2a) With the second embodiment, after the board that had the faulty drive is replaced onto the mother board, the data in the spare drives corresponding to the normal drives on the same board is all moved back to the normal drives. It should be noted, however, that the data in the spare drives includes data portions recovered in response to read requests issued for data in a normal drive on the board carrying the faulty drive while that board was being detached. Such data is the same as the data which is already retained in the normal drive and which has been in effect since before the board was detached. Thus the movement of data from the spare drive to the normal drive in the second embodiment should preferably exclude the data recovered in response to such read requests. This scheme is desirable where the movement of data is to be accomplished more quickly.

To implement the above scheme requires setting to the address table the information indicating, when data is written to the spare drive, whether that data has been written in response to a read request. In accordance with that information, whether or not to move the data from the spare drive to the normal drive on the replaced board may be controlled. This scheme is effective where there exists more data written in the spare drive in response to write requests from the CPU 1 than the data written thereto in response to read requests from the CPU 1.

(2b) With the second embodiment, when the board that had the faulty drive is replaced onto the mother board, the data written in the spare drive is moved therefrom to the corresponding normal board. Alternatively, the data to be held in the replaced normal drive may be recovered and stored into the spare drive which in turn may be used thereafter as a normal drive. In that case, of all data to be held in the normal drive, the data yet to be retained in the spare drive is to be recovered selectively and then written to the spare drive. This scheme is effective where a considerable portion of the data to be held in the normal drive is already retained in the spare drive.

(Third embodiment)

Whereas the first and the second embodiment are each a disc array system operating on the RAID 3 control principles, the third embodiment of the invention is a disc array system that adopts the RAID 5 scheme for its control. Thus although the third embodiment has the same system configuration as that in FIG. 1, the workings of the microprocessor 17 for control of the system differ from those for control of the first embodiment. In describing the third embodiment below, reference will be made to FIG. 1 and other circuit diagrams attached. The description of the third embodiment will emphasize its differences from the first embodiment. FIG. 9 is a view of a typical address table for use with the third embodiment.

(System operation in the absence of faulty drives)

The system operation of the third embodiment in the absence of faulty drives is primarily the same as that which takes place under the RAID 5 scheme. How the system works basically will be briefly described below for a better understanding of the RAID 5 scheme.

In the RAID 3 setup, the write data corresponding to one write request is divided into a plurality of sub data from which parity data is generated. The multiple sub data and parity data thus generated are written separately to different disc drives. In the RAID 5 setup, by contrast, the data corresponding to one write request is not divided. A plurality of data items corresponding to a plurality of write requests are used to define parity data. The multiple data and the parity data generated in conjunction therewith constitute one parity group. The data and the parity data are written separately to different disc drives. However, it is not necessary that all data belonging to the same parity group be prepared along with their parity data before it is written to a plurality of disc drives. That is, every time a write request is issued by the CPU 1, the system generates new parity data based on the corresponding write data and on the already generated parity data (old parity data) regarding the parity group to which the write data in question belongs. The write data and the generated parity data are written separately to two disc drives. When the CPU 1 issues a read request, the data designated by that request is read from the single drive where the data is held; the retrieved data is sent to the CPU 1.

More specifically, a plurality of storage locations belonging separately to a plurality of disc drives are assigned to each parity group. When the CPU 1 issues a write request to the array disc controller 2, the logical address designated by the write request is assigned a parity group and the storage location in any one drive allocated to that parity group. Where no data is held yet in the other storage locations allocated to the parity group in question, the remaining data of that parity group is regarded as consisting of a predetermined value (e.g., 0). Parity data is generated from the write data in question. The write data and the parity data thus generated are written separately to different disc drives.

When the same parity group is assigned to a second write request, the previously generated parity data (old parity data) regarding the parity group is read out. New parity data is generated from the old parity data and from the second data designated by the second write request. The second write data is written to the storage location assigned to the data, while the new parity data replaces the old parity data. The remaining data of the parity group is thereafter written in like manner. Thus the RAID 5 setup differs from the RAID 3 setup in that every time data is written, new parity data is generated from the write data in question and from the old parity data of the parity group to which the data belongs. What is noticeable here is that the other data of the same group is not used in generating the new parity data. When currently retained data is read from any one disc drive, the other data of the same parity group to which the written data belongs is not read out.

(System operation upon disc drive fault)

The system operation of the third embodiment in case of a disc drive fault is primarily the same as that of the first embodiment with the exception of differences stemming from what sets the RAID 5 scheme apart from the RAID 3 scheme. Illustratively, suppose that where a board having a faulty drive is mounted on the mother board, the system executes a write request from the CPU 1 for writing data to a normal drive. In this case, as in the case where no faulty drive exists, there is no need to divide the write data. Suppose also that while the board carrying the faulty drive is being detached from the mother board, the host device issues a write request to that faulty drive. In this case, the write data corresponding to the write request is accommodated temporarily in the cache memories 4.

When the board having the faulty drive replaced by a normal alternate drive is inserted back into the mother board, the data to be held in the alternate drive is recovered and written thereto. Thereafter, the write data retained in the cache memories 4 is written without being divided to the alternate drive. The same holds for the normal drives on the board having the faulty drive, except that there is no need to recover the data for these normal drives.

(Variations of the third embodiment)

The variations of the first embodiment may also be applied to the third embodiment. However, there need to be additional modifications attributable to the differences between the RAID 3 and the RAID 5 scheme.

For example, suppose that with the first variation of the first embodiment, the CPU1 issues a write request to a faulty drive while the board having that faulty drive is being withdrawn from the mother board. In this case, as described, the write data is divided into a plurality of sub data and parity data is generated in conjunction therewith. Of these sub data, the sub data other than those to be written to the faulty drive as well as the newly generated parity data are written separately to a plurality of disc drives. A third embodiment variation corresponding to this first variation of the first embodiment has no need to divide the write data. Suppose that the upper device supplies write data while the board having the faulty drive is being detached from the mother board. In this case, of the multiple data of the parity group to which the write data belongs, the data held in the drives other than the faulty drive as well as the parity data applicable to that parity group are read out. New parity data is generated from the data thus read out and from the write data supplied anew from the CPU 1. Then the newly generated parity data need only replace the old parity data.

The third embodiment may also be applied to RAID 4 array controllers.

(Fourth embodiment)

The fourth embodiment of this invention is the disc array system of the second embodiment adapted to operate on the RAID 5 control principles. Thus the fourth embodiment, as with the second embodiment, is implemented using the same system constitution as that in FIG. 1 supplemented by the spare drive board 50A. What makes the fourth embodiment different from the second embodiment is the manner in which the system is controlled by the microprocessor 17. In describing the fourth embodiment below, reference will be made to FIG. 1 and other circuit diagrams attached. The description of the fourth embodiment will emphasize its differences from the second and the third embodiment.

(System operation in the absence of faulty drives)

The system operation of the fourth embodiment in the absence of faulty drives is primarily the same as that of the second embodiment with the exception of differences stemming from what sets the RAID 5 scheme apart from the RAID 3 scheme. These differences have already been described in connection with what makes the third embodiment different from the first embodiment.

(System operation upon disc drive fault)

The system operation of the fourth embodiment in case of a disc drive fault is primarily the same as that of the second embodiment with the exception of differences stemming from what sets the RAID 5 scheme apart from the RAID 3 scheme. These differences have already been described in connection with what makes the third embodiment different from the first embodiment.

(Variations of the fourth embodiment)

The variations of the second embodiment may also be applied to the fourth embodiment. However, there need to be additional modifications attributable to the differences between the RAID 3 and the RAID 5 scheme.

For example, where the CPU1 issues a write request to a faulty drive and the request is serviced using a spare drive, there is no need to divide the write data as in the case where no faulty drives exist. That is, of the multiple data of the parity group to which the write data belongs, the data held in the drives other than the faulty drive as well as the parity data applicable to that parity group are read out. New parity data is generated from the data thus read out and from the write data supplied anew from the CPU 1. The write data is written to the spare drive, and the newly generated parity data replaces the old parity data.

The fourth embodiment may also be applied to RAID 4 array controllers.

(Fifth embodiment)

Unlike the embodiments described above, the fifth embodiment is one which applies where a board connector has developed a fault while all drives remain normal.

In case of a poor contact or other contact-related failure between the mother board and the connector of any drive board, all disc drives on that board become inaccessible. In that case, it is necessary to withdraw the board in question from the mother board so that the board will be replaced by a normal board. The fifth embodiment is in fact any of the preceding embodiments applied in that eventuality.

When the user detects a faulty connector of any board, the user gets the CPU 1 to issue a command notifying the array controller 2 of the impending withdrawal of the board. The user then withdraws the board in question from the mother board. Thereafter, the system operation is the same as that of any of the preceding embodiments which may be in use.

A poor connector contact of any drive board may be detected as follows: when any one drive on a given drive board currently mounted on the mother board is accessed unsuccessfully, the array controller 2 sets in the address table a flag indicating a fault of that drive. If other drives on the same board are found consecutively to be inaccessible, there is a high possibility of a fault other than drive-related faults in the individual drives. This should prompt the user to investigate what went wrong. When the user detects a poor connector contact of the board, the user inputs the command mentioned above. If there have been faulty drives detected prior to the check on faulty connector contact, the user enters commands for turning off the fault bits corresponding to such drives. In response to these commands, the array controller 2 resets the fault bits corresponding to the faulty drives on the designated board.

As described, the disc array system according to the invention operates continuously even as the board having faulty drives is being detached from the mother board in order for such drives to be replaced by normal alternate drives.

In case of a connector fault of any drive board, it is possible to execute data read and write requests designating data in any drive on the board in question.

As many apparently different embodiments of this invention may be made without departing from the spirit and scope thereof, it is to be understood that the invention is not limited to the specific embodiments thereof except as defined in the appended claims.

What is claimed is:

1. A disc array system, comprising:

(a) a group of disc storage devices divided into a plurality of logical groups, each logical group comprising a plurality of disc storage devices for holding groups of error correction data, each error correction data group comprising a plurality of data and an error correction code for the plurality of data (b) a plurality of local boards each for holding a number of disc storage devices within the group of disc storage devices;

(c) an array controller connected to the group of disc storage devices in such a manner that each local board can be disconnected from the array controller and can be connected to the array controller again thereafter, said array controller executing read requests and write requests provided by an upper device;

(c1) each write request being executed in such a manner that (c11) an error correction code is generated which should belong to an error correction data group to which write data attached to said each write request belongs, and that (c12) the write data and the generated error correction code are written into plural disc storage devices within the group of disc storage devices as data belonging to one error correction data group;

(c2) each read request being executed in such a manner that (c21) data requested by said each read request is read from at least one of the group of disc storage devices in case the one disc storage device is not faulty and that (c22) the requested data is recovered in case the one disc storage device is faulty, based upon one error correction code and plural other data which belong to one error correction data group to which said requested data belongs, and are held in other disc storage devices belonging to one logical group to which said one faulty disc storage device belongs;

wherein said group of disc storage devices are held on said plurality of local boards in such a manner that different sub-groups of disc storage devices belonging to a same logical group are held on mutually different ones of said plurality of local boards.

2. A disc array device according to claim 1, further comprising: a common board for holding the plurality of local boards in such a manner that each local board can be withdrawn from the common board and can be inserted again into the common board thereafter;

wherein said plurality of local boards is held by the common board in a substantially perpendicular position thereto and substantially in parallel to each other local board;

wherein said array controller is connected to the group of disc storage device by way of signal lines provided on the common board.

3. A disc array device according to claim 2, wherein plural disc storage devices mounted on each local board belong to mutually different logical groups.

4. A disc array device according to claim 2:

wherein said array controller accepts a read request which is supplied by said upper device after withdrawal of one of said local boards from said common board and which requests readout of one data held on one faulty disc storage device held on said one local board;

wherein said array controller executes an accepted said read request, in such a manner that said one data is recovered based upon plural other data held in other disc storage devices held on local boards other than said one local board, and that said recovered one data is supplied to said upper device;

wherein said array controller accepts another read request which is supplied by said upper device after said withdrawal and which requests readout of another data held in another normal disc storage device held on said one local board;

wherein said array controller executes said accepted another request, in such a manner that said another data is recovered based upon plural further other data held in further other disc storage devices held on local boards other than said one local board, and that said recovered another data is supplied to said upper device.

5. A disc array device according to claim 4, further comprising a random access memory;

wherein said array controller further accepts write requests each of which is supplied after said withdrawal and requires write data to be written into either one of said faulty disc storage device and said another normal disc storage device held on said one local board;

wherein said array controller temporarily stores write data requested by each of said accepted write requests into said random access memory;

wherein, after said one faulty disc storage device has been replaced by a normal replacing disc storage device and the one local board is inserted to said common board again, said array controller then executes said write requests to the replaced said one local board by using plural write data held in said random access memory.

6. A disc array device according to claim 5, wherein said array controller recovers plural data which were held in said one faulty disc storage device, and writes said recovered plural data into said replacing disc storage device, after insertion of said one local board and before execution of said write requests accepted after disconnection of said one local board from said common board;

wherein recovering of said plural data is executed based upon plural other data held in disc storage devices held on local boards other than said one local board;

wherein said other disc storage device are ones other than said one faulty disc storage device among disc storage devices belonging to one logical group to which said one faulty disc storage device belongs;

wherein said plural other data comprise plural error correction codes belonging to error correction data groups to which said plural data held in said one faulty disc storage device belong and plural data other than said plural data held in said one faulty disc storage device and said plural error correction codes among plural data belonging to those plural correction data groups.

7. A disc array device according to claim 4, wherein said array controller further accepts write requests each of which is supplied after said withdrawal of said one local board and requires write data to be written into either one of said faulty disc storage device and another normal disc storage device held on said one local board;

wherein said array controller executes each of said accepted write requests before said one faulty disc storage device is replaced by a normal replacing disc storage device and said one withdrawn local board is inserted to said common board again, in such a manner that an error correction code is generated for write data attached to said each write request, and is written into other one disc storage device held on one of said plurality of local board other than said one local board;

wherein said other one disc storage device is one belonging to an error correction data group to which one of said faulty disc storage device and said another normal disc storage device into which said each write data is to be written belongs;

wherein said array controller recovers plural data to be held in each of said replacing disc storage device and said another normal disc storage devices based upon plural other data held in other disc storage devices held on other local boards other than said one local board, and writes said plural data recovered for each of said replacing disc storage device and said another normal disc storage device therein.

8. A disc array device according to claim 7, wherein recovering of plural data for said another normal disc storage device is executed in such a manner that plural data supplied by said upper device to be written into said another normal disc storage device after said withdrawal of said one local board are recovered but plural data held by said another normal disc storage device before said withdrawal are not recovered.

9. A disc array device according to claim 4, further comprising at least one spare disc storage device connected to said common board;

wherein said array controller accepts write requests each of which is supplied by said upper device after said withdrawal of said one local board and requires write data to be written into one of said one faulty disc storage device and another normal disc storage devices held on said one local disc storage device:

wherein said array controller executes each accepted write request in such a manner that write data required by each accepted write request is written into said spare disc storage device;

wherein said array controller executes a read request supplied by said upper device after withdrawal of said one local board, so that data required by the read request is read out from said spare disc storage device, in case said required data is held in said spare disc storage device.

10. A disc array device according to claim 9, wherein said array controller writes data recovered as a result of execution of a preceding read request supplied by said upper device after said withdrawal of said one local board, into said spare disc storage device, in case said preceding read request requests data held in one of said one faulty disc storage device and said another normal disc storage devices held on said one withdrawn board;

wherein said array controller reads said recovered data written into said spare disc storage device, in case a subsequent read request supplied by said upper device requires read out of same data as the data required by said preceding read request.

11. A disc array device according to claim 9, wherein said array controller transfers part of plural data held in said spare disc storage device into said another normal disc storage devices held on said one local board, after said one faulty disc storage device is replaced by a normal replacing disc storage device and said one local board is inserted to said common board again, said part of plural data including plural data which were required to be written into said another normal disc storage device by write requests supplied by said upper device after withdrawal of said one local board.

12. A disc array device according to claim 11, wherein, after replacing of said one faulty disc storage device and said insertion of said one withdrawn local board, said array controller recovers plural data to be held in said replacing disc storage device, based on plural data held in plural disc storage devices held on plural local boards other than said one local board, and writes said recovered plural data into said replacing disc storage device, said plural data recovered including plural data held by said faulty disc storage device before said faulty disc storage device has become faulty and plural data supplied by said upper device as data to be written into said faulty disc storage device after said withdrawal of said one local board.

13. A disc array device according to claim 4, further comprising a plurality of spare disc storage devices;

wherein said array controller selects one of said plurality of spare disc storage devices for each of said faulty disc storage devices and said normal disc storage devices held on said one board, at withdrawal of said one local board;

wherein said array controller accepts a write request which is supplied by said upper device after withdrawal of said one local board and which requires write data to be rewritten into one of said faulty disc storage device and said another normal disc storage devices;

wherein said array controller executes said accepted write request in such a manner that said write data is written into one of said plurality of said spare disc storage devices selected for said one disc storage device;

wherein said array controller accepts a read request subsequently supplied by said upper device, so that data requested by said read request is read out from one of said plurality of spare disc storage devices, in case said requested data is already held therein.

14. A disc array device according to claim 13, further comprising at least one spare local board held on said common board so that said spare board can be withdrawn from said common board and can be inserted into said common board again;

wherein said plurality of spare disc storage devices are held on said spare board, and is connected to said array controller by way of the signal line provided on said common board.

15. A disc array device according to claim 13, wherein said array controller writes data recovered as a result of execution of a preceding read request supplied by said upper device after said withdrawal of said one local board, into one of said plurality of spare disc storage devices selected for said one of said one faulty disc storage device and said another normal disc storage device, in case said preceding read request requests data held therein;

wherein said array controller reads said recovered data written into said one spare disc storage device, in case a subsequent read request supplied by said upper device requires read out of same data as the data required by said preceding read request.

16. A disc array device according to claim 13, wherein said array controller transfers part of plural data held in one of said plurality of spare disc storage devices selected for said another normal disc storage device held on said one local board into said another normal disc storage devices, after said one faulty disc storage device is replaced by a normal replacing disc storage device and said one local board is inserted to said common board again, said part of plural data including plural data which were required to be written into said another normal disc storage device by write requests supplied by said upper device after withdrawal of said one local board.

17. A disc array device according to claim 16, wherein, after said one faulty drive has become faulty, said array controller recovers plural data which was held by said one faulty disc storage device before said one board has become faulty, and transfers said recovered plural data to one of said plurality of spare disc storage devices selected for said one faulty disc storage device;

wherein said array controller executes read requests and write requests supplied by said upper device after said one faulty disc storage device has become faulty so that the read requests and the write requests are executed by using said one spare disc storage device selected for said one faulty disc storage device, in case said read requests and said write requests designates data held in said one faulty disc storage device.

18. A disc array device according to claim 17, wherein, after said replacing of said one faulty disc storage device and said insertion of said one local board, said array controller keeps using said one spare disc storage device selected for said one faulty disc storage device, in place of said one faulty disc storage device, and uses said replacing disc storage device as one of said plurality of spare disc storage devices.

19. A disc array device according to claim 18, further comprising at least one spare local board held on said common board so that said spare board can be withdrawn from said common board and can be inserted into said common board again;

wherein said plurality of spare disc storage devices are held on said spare board, and is connected to said array controller by way of the signal line provided on said common board.

20. A disc array device according to claim 17, wherein, after replacing of said one faulty disc storage device and said inserting of said one local board, said array controller keeps using said one spare disc storage device selected for said one faulty disc storage device in place of said one faulty disc storage device, and uses said replacing disc storage device as one of said plurality of spare disc storage devices.

21. A disc array device according to claim 20, further comprising at least one spare local board held on said common board so that said spare board can be withdrawn from said common board and can be inserted into said common board again;

wherein said plurality of spare disc storage devices are held on said spare board, and is connected to said array controller by way of the signal line provided on said common board.

22. A disc array device according to claim 16, wherein, after withdrawal of said one local board, said array controller recovers plural data which was held by said one faulty disc storage device before said one board has become faulty, and writes said recovered plural data into one of said plurality of spare disc storage devices selected for said one faulty disc storage device;

wherein said array controller executes read requests and write requests supplied by said upper device after said one faulty disc storage device has become faulty, so that the read requests and the write requests are executed by using said one spare disc storage device selected for said one faulty disc storage device, in case said read requests and said write requests designates data held in said one faulty disc storage device.

23. A disc array device according to claim 13, wherein, after replacing of said one faulty disc storage device and said insertion of said one withdrawn local board, said array controller recovers plural data to be held in said replacing disc storage device, based on plural data held in plural disc storage devices held on plural local boards other than said one local board.

24. A disc array device according to claim 13, wherein, after said replacing of said one faulty disc storage device and said inserting of said one withdrawn local board, said array controller recovers plural data which was held by said one faulty disc storage device before said one board has been withdrawn from said common board, and writes said recovered plural data into said replacing disc storage device;

wherein said array controller further transfers plural data supplied by said upper device after said one faulty disc storage device has become faulty from one of said plurality of spare disc storage devices selected for said one faulty disc storage device, to said replacing disc storage device;

wherein said recovering is executed based on plural data held in plural disc storage devices held on plural local boards other than said one local board.

25. A disc array device according to claim 1, wherein plural disc storage devices mounted on each local board belong to mutually different logical groups.

26. A disc array device according to claim 1,
- wherein said array controller executes each write request supplied by said upper device, in such a manner that write data required by said each write request is divided into a plurality of sub-data, generates an error correcting code for said plurality of sub-data, and write said plurality of sub-data and said generated error correction code into plural disc storage devices held on mutually different local boards, as data belonging to one error correction data group;
- wherein said array controller executes each read request supplied by said upper device, in such a manner that a plurality of sub-data which form data requested by said read request are read from plural disc storage devices held on mutually different local boards, said plurality of sub-data combined into one data, and said one data is supplied to said upper device.

27. A disc array device according to claim 1,
- wherein an error correction data group comprises a plurality of write data required by a plurality of write requests supplied by said upper device and an error correction code for said plurality of write data;
- wherein said array controller executes each write request supplied by said upper device, in such a manner that said old write data to be updated by write data attached to said each write request is read and an old error correction code belonging to an error correction data group to which said write data belongs, a new error correcting code for said error correction data group is generated by said write data, said old error correcting code and said new error correcting code, and said write data and said generated new error correction code are written into plural disc storage devices held on mutually different local boards, as data belonging to said error correction data group;
- wherein said array controller executes each read request supplied by said upper device, in such a manner that data requested by said read request is read from one of disc storage devices held on one of said plurality of local boards, and is supplied to said upper device.

28. A disc array device according to claim 1:
- wherein said array controller accepts one read request which is supplied by said upper device after withdrawal of one of said local boards from said common board and which requests readout of one data held on one faulty disc storage device held on said one local board;
- wherein said array controller executes said accepted one read request, in such a manner that said one data is recovered based upon plural other data held in other disc storage devices held on local boards other than said one local board, and that said recovered one data is supplied to said upper device;
- wherein said array controller accepts another read request which is supplied by said upper device after said withdrawal and which requests readout of another data held in another normal disc storage device held on said one local board;
- wherein said array controller executes said accepted another request, in such a manner that said another data is recovered based upon plural further other data held in further other disc storage devices held on local boards other than said one local board, and that said recovered another data is supplied to said upper device.

29. A disc array device according to claim 28, further comprising a random access memory;
- wherein said array controller further accepts write requests each of which is supplied after said withdrawn and requires write data to be written into either one of said faulty disc storage device and said another normal disc storage device held on said one local board;
- wherein said array controller stores write data requested by each of said accepted write requests;
- wherein said array controller executes said write requests by using plural write data requested thereby and held in said memory, after said one faulty disc storage device has been replaced by a normal replacing disc storage device and the one local board is inserted to said common board again.

30. A disc array device according to claim 28, further comprising a plurality of spare disc storage devices;
- wherein said array controller selects one of said plurality of spare disc storage devices for each of said faulty disc storage devices and said normal disc storage devices held on said one board, at withdrawal of said one local board;
- wherein said array controller accepts a write request which is supplied by said upper device after withdrawal of said one local board and which requires write data to be rewritten into one of said faulty disc storage device and said another normal disc storage devices;
- wherein said array controller executes said accepted write request in such a manner that said write data is written into one of said plurality of said spare disc storage devices selected for said one disc storage device;
- wherein said array controller accepts a read request subsequently supplied by said upper device, so that data requested by said read request is read out from one of said plurality of spare disc storage devices, in case said requested data is already held therein.

31. A disc array system according to claim 1, wherein each sub-group of said different sub-groups comprises only one disc storage device, such that each disc storage device belonging to a same logical group is held on a local board which is different from other local boards holding other disc storage devices in the same logical group.

32. A disc array system according to claim 1, wherein each sub-group of said different sub-groups comprises a predetermined number greater than one of disc storage devices, such that each sub-group of said predetermined number of disc storage devices is held on a local board which is different from other local boards holding other sub-groups in the same logical group.

33. A disc array system according to claim 1, wherein a total number of disc storage devices of each sub-group of each logical group, held on a same local board does not exceed a maximum number of disc storage devices whose data can be recovered by using data and error correction data held by disc storage devices belonging to sub-groups of disc storage discs of said same logical group other than said each sub-group of disc storage devices held on said same local board.

34. In a disk array device, having:
- a group of disc storage devices divided into a plurality of logical groups, each logical group comprising a plurality of disc storage devices for holding error correction data groups, each error correction data group comprising a plurality of data and error correction data for the plurality of data;
- a plurality of local boards each for holding a number of disc storage devices within the group of disc storage devices; and
- an array controller connected to the group of disc storage devices in such a manner that each local board can be disconnected from the array controller and can be connected to the array controller again thereafter, said array controller executing read requests and write requests provided by an upper device, a disc array access method, comprising the steps of:
  (a) determining plural disc storage device which should belong each logical group, in such a manner that said plural disc storage device are held on mutually different ones of said plurality of local boards;
  (b) disconnecting one of said plurality of local boards which holds one faulty disc storage device, from said array controller at occurrence of a fault to said one disc storage device;
  (c) keeping accepting read requests each of which is supplied by an upper device after the disconnecting and requires readout of data held in one of said one faulty disc storage device and another normal storage device held on said one local board; and
  (d) executing each read request, in such a manner that read data required by said each read request is recovered, based upon plural data held on plural disc storage devices held on plural local boards other than said one disconnected board, and that said recovered data is supplied to said upper device.

35. A disc array access method according to claim 34,
wherein said disc array device further comprises a random access memory;
wherein said method further comprises the steps of:
  (e) keeping accepting write requests each of which is supplied by an upper device after the disconnecting of said local board and requires write data to be written into one of said faulty disc storage device and said another normal disc storage devices held on said one local board;
  (f) temporally holding plural write data required by said accepted write requests in said random access memory; and
  (g) executing, after said one faulty disc storage device is replaced by a replacing normal disc storage device and the one local board is connected to said array controller again, said plural write requests to said replacing normal disc storage device by using said plural write data held in said random access memory.

36. A disc array access method according to claim 34,
wherein said disc array device further comprises at least one spare disc storage device connected to said array controller;
wherein said method further comprises the steps of:
  (e) keeping receiving write requests each of which is supplied by an upper device after the disconnecting of said local board and requires write data to be written into one of said faulty disc storage device and said another normal disc storage devices held on said one local board;
  (f) executing each accepted write request in such a manner that write data requested by said each write request is written into said spare disc storage device; and
  (g) after said one faulty disc storage device has been replaced by a normal replacing disc storage device and the one local board is connected to said array controller again, transferring at least part of plural write data held in said spare disc storage device to said another normal disc storage device held on the one local board, said part of said plural write data being ones given by said upper device as ones to be written into said another normal disc storage devices.

37. A disc array access method according to claim 34,
wherein said disc array device further comprises a plurality of spare disc storage devices connected to said array controller;
wherein said method further comprises the steps of:
  (e) selecting one of said plurality of spare disc storage devices for each of said one faulty disc storage device and said another normal disc storage device held on said one local board at disconnecting of said one local board;
  (f) keeping receiving write requests each of which is supplied by an upper device after the disconnecting and requires write data to be written into one of said faulty disc storage device and said another normal disc storage devices held on said one local board;
  (g) recovering at said disconnecting of said one local board, plural data which were already held in said one faulty disc storage device before said one faulty disc storage device has become faulty, based upon plural data held on disc storage devices held on plural local boards other than said one local board;
  (h) writing said recovered plural data into one of said plurality of spare disc storage devices selected for said one faulty disc storage device;
  (i) executing said accepted write requests in such a manner that write data required by each of said accepted write request is written into one of said spare disc storage devices selected for one of said one faulty disc storage device and said another normal disc storage device into which said required write data is to be written;
  (j) keeping using said one spare disc storage device selected for said one faulty disc storage device in place of said one faulty disc storage device after said one faulty disc storage device has been replaced by a normal replacing disc storage device and the one local board is connected to said array controller again; and
  (k) using said replacing disc storage device as a new spare disc storage device.

38. A disc array access method according to claim 37, further comprising the steps of:
  (l) after said connecting again, transferring plural write data held in another one of said plurality of spare disc storage devices selected for said another normal disc storage device to said another normal disc storage device held on the one local board; and
  (m) releasing said another spare device as a new spare device.

39. A disk array system comprising:
a group of disc storage devices divided into a plurality of logical groups, each logical group comprising a plurality of disc storage devices for storing data including error correction data;
a plurality of local boards each for holding a predetermined number of disc storage devices of said group of disc storage devices;
an array controller connected to the group of disc storage devices in such a manner that each local board can be disconnected from the array controller and can be connected to the array controller again thereafter, said array controller executing read request and write requests provided by an upper device;
wherein said group of disc storage devices are held on said plurality of local boards in such a manner that different sub-groups of disc storage devices belonging to a same logical group are held on mutually different ones of said plurality of local boards, such that, when one disc storage device of an affected logical group becomes faulty and an affected local board is disconnected from said array controller, said disk array system can continue to operate by reconstructing data contained on the faulty said one disc storage device using data from disc storage devices of said affected logical group, which are held on unaffected, different ones of said plurality of local boards.

40. A disc array system, comprising:

(a) a group of disc storage devices divided into a plurality of logical groups, each logical group comprising a plurality of disc storage devices for holding groups of error correction data, each error correction data group comprising a plurality of data and an error correction code for the plurality of data;

(b) a plurality of local boards each for holding a number of disc storage devices within the group of disc storage devices;

(c) an array controller connected to the group of disc storage devices in such a manner that each local board can be disconnected from the array controller and can be connected to the array controller again thereafter, said array controller executing read requests and write requests provided by an upper device;

(c1) each write request being executed in such a manner that (c11) an error correction code is generated which should belong to an error correction data group to which write data attached to said each write request belongs, and that (c12) the write data and the generated error correction code are written into plural disc storage devices within the group of disc storage devices as data belonging to one error correction data group;

(c2) each read request being executed in such a manner that (c21) data requested by said each read request is read from at least one of the group of disc storage devices in case the one disc storage device is not faulty and that (c22) the requested data is recovered in case the one disc storage device is faulty, based upon one error correction code and plural other data which belong to one error correction data group to which said requested data belongs, and are held in other disc storage devices belonging to one logical group to which said one faulty disc storage device belongs;

wherein said group of disc storage devices are held on said plurality of local boards in such a manner that disc storage devices belonging to a same logical group are held on mutually different ones of said plurality of local boards.

41. A disc array system, comprising:

(a) a group of disc storage devices divided into a plurality of logical groups, each logical group comprising a plurality of disc storage devices for holding groups of error correction data, each error correction data group comprising a plurality of data and an error correction code for the plurality of data;

(b) a plurality of local boards each for holding a number of disc storage devices within the group of disc storage devices;

(c) an array controller connected to the group of disc storage devices in such a manner that each local board can be disconnected from the array controller and can be connected to the array controller again thereafter, said array controller executing read requests and write requests provided by an upper device;

(c1) each write request being executed in such a manner that (c11) an error correction code is generated which should belong to an error correction data group to which write data attached to said each write request belongs, and that (c21) the write data and the generated error correction code are written into plural disc storage devices within the group of disc storage devices as data belonging to one error correction data group;

(c2) each read request being executed in such a manner that (c11) data requested by said each read request is read from at least one of the group of disc storage devices in case the one disc storage device is not faulty and that (c22) the requested data is recovered in case the one disc storage device is faulty, based upon one error correction code and plural other data which belong to one error correction data group to which said requested data belongs, and are held in other disc storage devices belonging to one logical group to which said one faulty disc storage device belongs;

wherein said group of disc storage devices are held on said plurality of local boards in such a manner that disc storage devices belonging to a same logical group are held on plural ones of said plurality of local boards.

42. A disc array system according to claim 41, wherein a total number of disc storage devices which are held on a same local board and belong to a same logical group does not exceed a maximum number of disc storage devices whose data can be recovered by using data and an error correction code held by disc storage devices belonging to said same logical group other than said disc storage devices which are held on said same local board and belong to said same logical group.

* * * * *

UNITED STATES PATENT AND TRADEMARK OFFICE
CERTIFICATE OF CORRECTION

PATENT NO. : 5,600,783
DATED : February 4, 1997
INVENTOR(S) : Hitoshi KAKUTA et al.

It is certified that error appears in the above-indentified patent and that said Letters Patent is hereby corrected as shown below:

Col. 21, line 9, change "device" to --devices--.

Claim 7, line 36, change "board" to --boards--.

Col. 22, line 19, after "withdrawn" insert --local--.

Claim 13, line 57, before "board" insert --local--.

Col. 23, line 33, change "devices" to --device--.

Signed and Sealed this

Twelfth Day of August, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,600,783
DATED : February 4, 1997
INVENTOR(S) : Hitoshi KAKUTA et al.

It is certified that error appears in the above-identified patent and that said Letters Patent is hereby corrected as shown below:

Column 21, last line, change "disc storage device" to --board--.

Column 23, line 6, delete "local".

Column 27, line 6, change "device" to --devices--;
         line 7, after "belong" insert --to--; and
         line 8, change "device" to --devices--.

Signed and Sealed this

Third Day of February, 1998

BRUCE LEHMAN

Attest:

Attesting Officer

Commissioner of Patents and Trademarks